(12) United States Patent
Mizobuchi et al.

(10) Patent No.: US 6,413,674 B1
(45) Date of Patent: Jul. 2, 2002

(54) METHOD OF MANUFACTURING HIGHLY-AIRTIGHTENED POROUS PAPER, HIGHLY-AIRTIGHTENED POROUS PAPER MANUFACTURED BY THE METHOD, AND NON-AQUEOUS BATTERY USING THE PAPER

(75) Inventors: Taiji Mizobuchi, Kochi-ken; Teruyuki Jinzenji, Nankoku, both of (JP)

(73) Assignee: Nippon Kodashi Corporation (JP)

( * ) Notice: Subject to any disclaimer, the term of this patent is extended or adjusted under 35 U.S.C. 154(b) by 0 days.

(21) Appl. No.: 09/504,941

(22) Filed: Feb. 16, 2000

Related U.S. Application Data

(62) Division of application No. 08/966,483, filed on Nov. 7, 1997, now Pat. No. 6,074,523.

(30) Foreign Application Priority Data

Nov. 11, 1996 (JP) .............................................. 8-315609
Jan. 31, 1997 (JP) .............................................. 9-032961

(51) Int. Cl.[7] ................................................ H01M 2/16

(52) U.S. Cl. ........................ 429/255; 429/249; 429/251

(58) Field of Search ................................. 429/249, 255, 429/251

(56) References Cited

PUBLICATIONS

Kuribayashi, "Characterization of composite cellulosic separators for rechargeable lithium–ion batteries", Journal of Power Sources, vol. 63, Issue: 1, pp. 87–91, Nov. 1996.*

* cited by examiner

Primary Examiner—Carol Chaney
(74) Attorney, Agent, or Firm—Liniak, Berenato, Lonacre & White, LLC

(57) ABSTRACT

Paper that has minute pores, denseness, a high degree of airtightness and is made from cellulose which has superior heat and chemical resistance and is reproducible natural resources. Further, a non-aqueous battery which is improved to a higher level with regards to various characteristics, e.g., heat resistance, electrical characteristics such as ion transmissivity or liquid-holding characteristics, or prevention of an internal short circuit, through use of, as a separator for electronically separating a positively active substance from a negatively active substance, a novel porous highly-airtightened separator which is made from cellulose and has pores and denseness. The separator is manufactured from highly-airtightened porous paper having minute pores made by forming wet paper web from minute cellulose having a fiber diameter of 1 μm or less, and drying the wet paper web while voids in the wet paper web are maintained. The separator is used in a non-aqueous battery or electrolytic capacitor. More specifically, cellulose whose fibers are beaten to a JIS-CSF value of 200 ml or less (where the JIS-CSF value is measured in accordance with JIS P8121) or cellulose whose fibers are beaten to a value of 700 ml or less measured by modified CSF (wherein 3 g of a sample is measured as 0.3 g of a sample by the method specified in JIS P8121) is used as the minute cellulose.

40 Claims, 7 Drawing Sheets (A)

(C)

(B)

METHOD OF MANUFACTURING HIGHLY-AIRTIGHTENED POROUS PAPER, HIGHLY-AIRTIGHTENED POROUS PAPER MANUFACTURED BY THE METHOD, AND NON-AQUEOUS BATTERY USING THE PAPER

This application is a division of 08/966,483 filed Nov. 7, 1997, now U.S. Pat. No. 6,074,523.

BACKGROUND OF THE INVENTION

1. Field of the Invention

This invention relates to a highly-airtightened porous paper used principally as an industrial material such as a battery separator, a separator used in an electrolytic capacitor or various types of filters and, more particularly, to novel paper that has minute pores, denseness, and a high degree of airtightness and is made from cellulose which has superior heat and chemical resistance and is a reproducible natural resource.

Further, the present invention relates to a non-aqueous battery. More particularly, this invention is intended to improve various characteristics of the non-aqueous battery, such as heat resistance, ion transmissivity, liquid-holding characteristics, and an internal short circuit, to a greater extent by use of a separator which has minute pores, denseness, and a high degree of airtightness and is made from cellulose which electronically separates the activity of a positively active substance from a negatively active substance.

2. Description of the Background Art

Paper is one of the most familiar articles and is used for packaging foods or beverages or decorating a house, to say nothing of being used as newspapers or book papers. Further, the paper is used as an industrial material in many applications and is one of modern sciences subjects of study. In general, paper is manufactured by dispersing into water cellulose which is prepared by cooking vegetable fibers with chemicals, removing the wet paper web from a papermaking slurry with a screen, and drying this scooped wet paper web.

The cellulose fibers of the paper are bonded together primarily by means of the hydrogen bonding of the cellulose. Specifically, when water evaporates from the wet paper web during the drying process, adjacent cellulose fibers are forcefully attracted together by the strong surface tension of the water. When the distances between the fibers are reduced, Van der Waal's force acts on the fibers to thereby attract the fibers together to a much greater extent. Finally, the fibers are brought into close contact with each other by hydrogen bonding. The degree of hydrogen bonding and the diameter of the fiber determine the extent of the air gap between the fibers, i.e., the degree of airtightness of the paper.

Cellulose which forms paper is a natural macromolecule and is able to resist heat in the vicinity of 230° C. and it has a high resistance to chemicals such as acid, alkaline, or organic solvents. For these reasons, paper is widely used as an inexpensive industrial material, such as a separator used in a battery or an electrolytic capacitor, or as various types of filters.

A porous film is also used as an industrial material in the same applications as the paper. This porous film is as thin as 10 to 40 $\mu$m, and minute pores of about 0.1 $\mu$m in size are uniformly formed on the entire film surface. Accordingly, the film is used as a filter. Further, in spite of the high degree of electrical insulating characteristics of the film itself, the electrical resistance of the film when it is impregnated with an electrolyte is low. For this reason, the porous film is used as an industrial material, e.g. as separators used in various types of batteries.

Thermoplastic resin included in petroleum resin or a cellulose derivative such as cellulose acetate is used as material for the porous film. A porous film is manufactured from thermoplastic resin by heating and fusing thermoplastic resin in the form of a film, and dissolving a previously drawn or mixed inorganic substance into the acid. When a porous film is manufactured from a cellulose derivative, a film is formed by dissolving the cellulose derivative into a solvent such as acetic acid or acetone, and drawing the thus-formed film.

In addition, non-aqueous batteries, such as lithium batteries or lithium ion secondary batteries, are compact and lightweight and have a large energy density by weight. It is for these reasons that in recent years, the non-aqueous battery has sprung into wide use as a power source of portable electronic equipment, such as cellular phones, notebook computers, or self-contained video cameras. The volume of production of the non-aqueous battery significantly increases year by year. The non-aqueous battery uses as an electrolyte a non-aqueous solvent; e.g., an aprotic organic solvent such as propylene carbonate, methyl ethyl carbonate, ethylene carbonate, methyl propionic acid, $\gamma$-butyrolactone, or diethoxyethane. A substance, such as $LiBF_4$, $LiPF_6$, or $CH_3SO_3Li$, is dissolved as an electrolyte into the foregoing solvent. A lithium-contained oxide substance such as $LiCoO_2$ or $LiNiO_2$ is used as the positively active substance, and a carbon material such as graphite is used as the negatively active substance.

Elements which determine the performance of the non-aqueous battery include the prevention of an internal short circuit as a result of the positively active substance coming into contact with the negatively active substance for the purpose of reducing the proportion of short-circuit failures; retaining the sufficient and required amount of electrolyte for an electromotive reaction; and ensuring a superior transmissivity of a charge carrier required for the reaction of a battery, i.e., a reduction in the impedance, or particularly equivalent series resistance (hereinafter referred to as ESR), in order to reduce the internal resistance of the battery without impeding the transmission of ions. The proportion of short-circuit failures to ESR's is greatly dependent on the separator.

Short-circuit failures have two types of proportions: the proportion of short-circuit failures which occurred at the time of assembly of the battery and the proportion of short-circuit failures which occurred at the time of the use of the battery in the market. In either case, a short circuit arises in the weak portion of the separator. For example, if a pin hole is formed in the separator, a short circuit occurs in the pin hole. To reduce the proportion of short-circuit failures, there is a demand for a separator which is formed as uniformly as possible and has a high density without a pore such as a pin hole. In other words, there is a demand for a separator having a high degree of airtightness.

Contrary to the improvement of the proportion of short-circuit failures, in order to reduce the ESR, a porous separator, i.e. a separator having a low degree of airtightness is demanded to ensure pores which permit the passage of ions. This is due to ionic conduction, which is effected in the non-aqueous battery, where electric charges move as a result of the transmission of charged ions in the non-aqueous battery. As described above, there are two contradictory demands for the separator, i.e., a separator having a high degree of denseness or a high degree of airtightness in order to reduce the proportion of short-circuit failures, and a porous separator having a low degree of airtightness in order to improve the ESR of the battery.

A polyolefine-based porous film or unwoven fabric is used as a separator which has a high degree of airtightness and pores and is to be used in a non-aqueous battery. More specifically, porous polypropylene or polyethylene film is commercially available. A polyolefine-based unwoven fabric is principally used in coin-type batteries, and a polyolefine-based porous film is principally used in cylindrical batteries.

The polyolefine-based porous film is as thin as 10 to 40 µm, and minute pores are uniformly formed on the entire film surface, so that an air resistance of thousands of seconds/100 cc to tens of thousands of seconds/100 cc are obtained. In spite of a high degree of electrical insulating characteristics of the film itself, the electrical resistance of the film when it is impregnated with an electrolyte is low. For this reason, the porous film is used as a separator.

If the polyolefine-based porous film is heated to an abnormally high temperature, the film is fused at an internal temperature of about 120 to 170° C., thereby resulting in a shut down effect in which the minute pores will close to thereby prevent the flow of an electrical current. This shut down effect acts as a safety mechanism.

However, since the existing separator is formed from polyolefine-based substances, the separator has a fusing point (polyethylene does not have a resistance to temperature, at most, it is 120° C., whereas polypropylene has a resistance to a temperature of 160° C.) and lacks dimensional stability. Accordingly, if the internal temperature of the existing separator becomes high, shrinkage deficiencies arise in the porous film, and an internal short circuit can occur in the shrinkage deficiency. An electrical current concentrates around the short-circuited area before the battery becomes completely shut down, thereby resulting in an upsurge in the internal temperature. The polyolefine-based porous film holds the risk of becoming fused and abnormally heated. Further, if the temperature of the film has reached a temperature of 130° C. or more, the porous film may become fused and effluent. An internal short circuit occurs across both polarities, thereby building a fire. Therefore, in order to greatly improve the degree of safety, there is a demand for a separator of a non-aqueous battery holding a higher degree of heat resistance and dimensional stability.

Further, there are desired increases in the volume of the non-aqueous battery and a reduction in the size and weight of the same, and hence the reduction in the thickness of the separator is even more desirable. Originally, pin holes of the order of micrometers, more specifically, a plurality of pin holes like oval cracks measuring 0.5 µm in major axis and 0.05 µm in minor axis, are distributed over the existing polyolefine-based porous film. The pin holes of the order of micrometers permit the passage of minute particles of active substances of both polarities, which in turn may reduce the volume or lifetime of the battery or cause an internal short circuit. If the thickness of the separator is reduced, the rate of occurrence of pin holes increases, and the size of the resultant pin holes also becomes larger, thereby rendering the separator more apt to cause a short circuit. Therefore, it becomes impossible to respond to the demand for a thinner separator. Since the polyolefine-based porous film is not lyophilic and is not impregnated with an electrolyte well, the amount electrolytes held in the battery reduces, thereby shortening the lifetime of the battery.

To improve the safety of this product, it is desirable that the non-aqueous battery holds a higher degree of heat resistance. More specifically, in the case of a lithium-ion battery, there is a demand for a separator that retains its shape at a temperature of 190° C. or more which is the ignition point of lithium. At present, there are no porous films which have such heat resistance. Polyethylene or polypropylene is an expensive material and requires a complex manufacturing process, which makes it difficult to reduce its cost. These days, new materials are sought after, since polyethylene and polpropylene are pertroleum resources which can negatively effect our environment.

Cellulose is a reproducible and inexpensive material which has both heat and chemical resistance. The cellulose is a material which has resistance to heat up to a temperature of 230° C. As can be seen from the fact that a chemical agent which dissolves cellulose is still sought, the cellulose is stable with respect to chemical contact. If a separator which has minute pores, denseness, and a high degree of airtightness can be formed from cellulose, the proportion of short-circuit failures and ESR of the battery are reduced, thereby improving various characteristics of the separator, such as heat resistance, ion transmissivity, liquid-holding characteristics, and prevention of an internal short circuit to a much greater extent. However, the separator manufactured by an existing papermaking method cannot simultaneously satisfy the demand for pores and the demand for increased airtightness. If an attempt is made to increase the degree of airtightness to 1000 sec/100 cc in order to prevent an internal short circuit and the proportion of short-circuit failures while paper is formed to a thickness of 100 µm or less which makes it possible to use the paper as a separator for non-aqueous battery, the cellulose pulp must be beaten to a density of about 0.75 g/cm$^3$. As a result, the separator becomes a film, and pores which permit the passage of ions are lost, thereby deteriorating the ESR of the film.

In a case where a separator for a non-aqueous battery is manufactured from cellulose, controlling the airtightness of the separator is an important factor in determining the performance of the separator. To improve the proportion of short-circuit failures and the ESR of the battery, it is desirable to have a separator with minute pores and a high degree of airtightness, more specifically, an airtightness of 1000 sec/100 cc or more. This is because a separator having an airtightness of hundreds sec/100 cc has pinholes even if it has denseness as a whole.

In a case where paper is used as an industrial material such as a separator for a battery, the control of airtightness of the paper is important. The separator used in a battery for separating a positively active substance from a negatively active substance within the battery is strongly desired to have a certain denseness in order to separate the active substances from each other. Particularly, the standard requirement for a separator which is used in a lithium-ion battery, is that the separator must have an airtightness of 1000 sec/100 cc or more in order to ensure the denseness of the separator.

The airtightness of paper made from cellulose is controlled by the following two existing methods. One method is manufacturing a separator with a higher density, by further beating cellulose fibers, and the other method is controlling the airtightness of the paper by increasing the thickness of the separator.

In reference to controlling the airtightness of the paper by adjusting the extent of beating the cellulose, if a separator with a low density is made from more softly beaten cellulose fibers, the separator will have a lower degree of airtightness. In contrast, if a separator with a high density is made from sufficiently-beaten cellulose fibers, the separator will have a higher degree of airtightness. If a separator which has a density of 0.3 g/cm$^3$ and a thickness of about 50 $\mu$m is made from virgin pulp which has a value of 770 ml as CSF specified by JIS P8121 (Canadian Standard Freeness which will be hereinafter referred to as JIS-CSF), i.e., virgin pulp whose cellulose fibers are not substantially beaten, the airtightness of the paper can be controlled to about 1 sec/100 cc. If a separator is manufactured by beating the cellulose fibers to a JIS-CSF value of about 400 ml, the density of the separator can be increased from 0.3 g/cm$^3$ to 0.55 g/cm$^3$ and the airtightness of the separator can be controlled to hundreds of sec/100 cc, given that the thickness of the separators are the same.

Conclusively, the airtightness of the paper can be controlled from thousands of sec/100 cc to tens of thousands of sec/100 cc or more if the cellulose fibers are beaten to a greater extent. However, if hardly-beaten raw materials are used for manufacturing the separator, pores which can penetrate the separator, disappear. For this reason, it is impossible for the existing separator to achieve an airtightness of greater than 1000 sec/100 cc. If cellulose fibers are beaten to a JIS-CSF value of about 200 ml or more and a separator is manufactured from these cellulose fibers, the air gaps between fibers disappear, which in turn prevents pores from being formed in the separator. Then the airtightness becomes infinite, which makes it impossible to actually measure the airtightness. This problem is inevitable, so long as the separator is manufactured from cellulose possessing autohesion (the capacity to bond together). The disappearance of pores results in the disappearance of passages for ions, thereby considerably deteriorating the ESR of the battery.

In general, as the diameter of the fibers become smaller, a greater forces act on the voids between the fibers of the wet paper web. This phenomenon is known as the Campbell effect. According to the calculation of the Campbell effect, the attracting force acting on fibers having a diameter of 30 $\mu$m is 6.1 kg/cm$^2$, whereas the attracting force acting on fibers having a diameter of 2 $\mu$m is 38 kg/cm$^2$. If the diameter of the fiber becomes 0.2 $\mu$m, the attracting force acting on the fibers becomes 174 kg/cm$^2$. In comparison with the original size of vegetable fibers, the size of hardly-beaten vegetable fibers becomes smaller, and the attracting force acting between the fibers becomes larger, and hence the distance between the fibers also becomes reduced. When the wet sheet enters the drier process, the remaining water evaporates. Since the surface tension of water is great, the adjacent fibers are strongly attracted together. When the distance between the fibers decreases, Van der Waal's force acts on the fibers, thereby further attracting the fibers together. Finally, the fibers are brought into close contact with each other by hydrogen bonding, so that the voids between the fibers are reduced. If the fibers are beaten to a JIS-CSF value of 200 ml or less, the voids between the fibers of a resultant separator disappear. Consequently, quently it becomes impossible to measure the density of the separator. Pores which permit the passage of ions disappear. In contrast, when the fibers are more softly beaten and the profile of the fibers can be retained, there still exists a plurality of voids in the fibers as a whole even if fibers make hydrogen bonds with each other at points where they come into contact.

Even if a JIS-CSF value is minutely adjusted before the value of fibers reaches a JIS-CSF value of 200 ml, the airtightness of the separator cannot be controlled to a value greater than 1000 sec/100 cc. As described above, when the diameter of fibers decreases, the force acting between the fibers sharply increases. Further, when the cellulose fibers are beaten, cellulose fibers are not cleaved into two's or three's stepwise. Fibrils having a diameter of about 0.4 $\mu$m grow stepwise from the outer surface of the fiber in much the way that whiskers do. More specifically, the extent to which the cellulose fibers are beaten is the state of occurrence of fibrils having a diameter of 0.4 $\mu$m. The progress in the extent of beating of the cellulose fibers represents an increase in the proportion of fibrils. In contrast, cellulose fibers from which paper is made, e.g., fibers of conifers, have an oval shape and measure 40 $\mu$m in major axis and 10 $\mu$m in minor axis. Fibers of Manila hemp pulp have a substantially circular shape and a diameter of about 20 $\mu$m. In the case of the Manila hemp pulp, the extent of beating can be grasped as a variation in the rate of fibers having a diameter of 20 $\mu$m to fibrils having a diameter of 0.4 $\mu$m. Therefore, the airtightness of the paper cannot be controlled by minutely adjusting the JIS-CSF value before the value reaches a JIS-CSF of 200 ml. Even if an attempt is made to control the airtightness of the paper, it is thought that variations ranging from plus or minus thousands to tens of thousands sec/100 cc will arise.

For this reason, it is possible to manufacture a separator having an airtightness of hundreds of sec/100 cc by controlling the extent of the beating, but it is impossible to manufacture a separator by controlling the airtightness to one thousand to tens of thousands sec/100 cc while retaining the pores which enable the passage of ions. More specifically, it is impossible to manufacture, from cellulose, a separator which has pores and a high degree of airtightness.

Another existing method of increasing airtightness is to increase the thickness of a separator. Theoretically, as the distance through which air travels becomes longer, airtightness becomes higher. Accordingly, if the thickness of the separator is increased, it is possible to manufacture a separator which has a high degree of airtightness. However, in a case where paper is used as an industrial material such as a separator used in a battery, it is most desirable that the paper is as thin as possible. Paper having the thickness ranging from 15 to 100 $\mu$m is principally used as the separator. For example, a porous film principally used as a separator of a lithium-ion battery generally has a thickness of 25 $\mu$m, and a separator principally used in an electrolytic capacitor has a thickness of 15 to 90 $\mu$m. In effect, paper having a thickness smaller than those of the foregoing separators, cannot be used as a separator. Particularly, at the present time, there is a demand for a battery which has a larger volume and is compact and lightweight, and therefore it is expected that the thickness of paper will be reduced further. Accordingly, it is impossible to control the airtightness of paper to a value of 1000 sec/100 cc or more within the thickness range of 100 $\mu$m or less, which is required for a separator when it is used as an industrial material, by adjusting the thickness of the paper or by adjusting the extent of the beating of cellulose fibers and the thickness of the paper in combination.

For these reasons, the foregoing porous film is currently used as an industrial material, such as a battery separator or as various types of filters, which are porous and require a high degree of airtightness. A film-which has an airtightness which ranges from thousands of sec/100 cc to tens of thousands of sec/100 cc can be used as a porous film.

Thermoplastic resin included in petroleum resin or a cellulose derivative such as cellulose acetate is used as the material for porous film. Polyethylene (PE) or polypropylene (PP) is principally used as a thermoplastic resin for the petroleum resin. This type of resin possesses superior resistance to chemicals but a low resistance to heat. Specifically, polyethylene has a resistance to temperature of, at most 120° C. and polypropylene has a resistance to temperature of 160° C. In contrast, although cellulose acetate which is one of the cellulose derivatives has resistance to temperature in the vicinity of 230° C., it lacks a resistance to chemicals because the cellulose acetate is dissolved in an acetic acid or acetone. For these reasons, a porous film made from a cellulose derivative cannot be used as a battery separator. As described above, if a porous film has a superior resistance to chemicals, it may have a low resistance to heat. In contrast, if a porous film has a superior heat resistance, it may have a low resistance to chemicals. There are no porous films possessing resistance to both heat and chemicals. Further, thermoplastic resin which is the material for porous film is expensive and requires a complicated manufacturing process. Therefore, it is difficult to reduce the manufacturing cost of the film.

In contrast, it is expected that a separator, or the like, which has a higher degree of heat resistance will be developed, in order to improve the safety of industrial products such as batteries. For instance, in the field of the lithium-ion battery, there exists a demand for a separator which retains its shape at a temperature of 190° C. or more at which lithium catches fire. Presently, there is no porous film with a heat resistance that can respond to this demand. Both polyethylene and polypropylene are petroleum-based resources, and a new material is sought in terms of environmental consideration.

Table 5 shows the results of a comparison of the properties between paper manufactured by a conventional method and porous film manufactured from a thermoplastic resin of the petroleum-based resin.

As shown in Table 5, cellulose used as the material of the film has resistance to heat up to a temperature of 230° C. As can be seen from the fact that a chemical agent which dissolves cellulose is still sought, it is said that the cellulose is stable with respect to chemicals and has a resistance to both heat and chemicals. In contrast, the porous film inherently lacks resistance to heat and chemicals. Provided that high-density paper which is manufactured from hardly-beaten material and has an infinite and unmeasurable airtightness can be formed to be porous, then, paper which has a high degree of airtightness and a low degree of density and is presently impossible to manufacture, can be produced. More specifically, if paper with minute pores which permit the passage of air, can be manufactured even from hardly-beaten material, paper having a high degree of airtightness and a low degree of density can be produced. This paper would have a high degree of airtightness and a low degree of density, and would enable a high level of control of the airtightness. As practiced in the prior art, if the airtightness of paper is increased, the density of the paper is also increased, thereby deteriorating the electrical characteristics of the paper. In contrast, if the density of the paper is reduced to improve the electrical characteristics of the paper, the airtightness of the paper reduces, thereby resulting in an insufficient denseness of the paper. Therefore, the paper having a high degree of airtightness and a low degree of density will make it possible to eliminate the deficiency of the paper, i.e., the difficulty in satisfying improvements in the airtightness and the electrical characteristics of the paper at one time. Further, such paper can be used in fields where a porous film cannot be used, owing to its insufficient heat resistance or can contribute to improvements in the safety of products in which the paper is already used. Simultaneously, the paper is desirable because it enables the conversion of petroleum resources to reproducible natural resources.

In view of the foregoing problems in the background art, the object of the present invention is to provide highly-airtightened porous paper which was produced from a reproducible natural resource, i.e., cellulose having superior resistance to heat and chemicals, and has minute pores and a low degree of density. More specifically, the object of the present invention is to provide highly-airtightened porous paper which has a thickness of 100 $\mu$m or less and an airtightness of 1000 sec/100 cc or more.

To manufacture a porous separator from cellulose and in order to improve the ESR of the separator, it is necessary to produce a thin separator which has a low degree of density in contrast with the case where the proportion of short-circuit failures is improved. However, if the thickness or density of the separator is reduced, the airtightness of the separator will be inevitably reduced. Further, if the thickness of the separator is increased to improve the airtightness of the separator, the ESR of the separator will deteriorate like a linear expression. In contrast, if the density of the separator is increased, the ESR will deteriorate like a second-order equation.

As described, in the prior art, it is impossible to manufacture a porous and highly-airtightened separator from cellulose, which has pores to permit the passage of ions. Therefore, it hag been impossible to realize a high level of improvement in both the proportion of short-circuit deficiencies and in the ESR of the separator.

Accordingly, provided that high-density paper which is manufactured from hardly-beaten material and has infinite and unmeasurable airtightness can be formed to be porous, a separator which has a high degree of airtightness and a low degree of density and is presently impossible to manufacture can be produced. More specifically, if a separator with minute pores which permits the passage of air can be manufactured even from a hardly-beaten material, a separator having a high degree of airtightness and pores for the passage of ions can be produced from cellulose. This separator which will have a high degree of airtightness and a low degree of density will enable a high level of control in airtightness. As practiced in the prior art, if the airtightness of the separator is increased, the density of the separator is also increased, thereby deteriorating the ESR of the separator. In contrast, if the density of the separator is reduced to improve the ESR of the separator, the airtightness of the separator reduces, thereby resulting in an sufficient denseness of the separator. Therefore, a separator having a high degree of airtightness and a low degree of density will make it possible to eliminate the deficiency of the separator, i.e., the difficulty in realizing a high level of improvement in the proportion of short-circuit deficiencies and the ESR of the separator at one time. Further, cellulose is a reproducible natural resource and does not present a problem associated with industrial waste. Therefore, such a separator is desirable because it enables the conversion of petroleum resources to reproducible natural resources.

Accordingly, in view of the foregoing problems in the background art, the object of the present invention, is to provide a novel, highly-airtightened porous separator which will be produced from a reproducible natural resource, i.e., cellulose having superior resistance to heat and chemicals, and has minute pores and a low degree of density. More specifically, the object of the present invention, is to provide a non-aqueous battery which will be improved to a higher level with regard to various characteristics, e.g., heat resistance, electrical characteristics such as ion transmissivity or liquid-holding characteristics, or prevention of an internal short circuit, through use of a highly-airtightened separator.

SUMMARY OF THE INVENTION

To achieve the object, in accordance with one aspect of the present invention, a method of manufacturing highly-airtightened porous paper is provided, using a method comprising the steps of: manufacturing wet paper web from minute cellulose which is used as raw material and has a fiber diameter of 1 μm or less; and drying the wet paper web while voids in the wet paper web are retained, so that highly-airtightened porous paper having minute pores will be formed.

In accordance with another aspect of the present invention, a non-aqueous battery is provided which electronically separates a positively-active substance from a negatively-active substance by a separator, the improvement being characterized by the fact that the separator with minute pores is manufactured by the steps of forming wet paper web from cellulose, and drying the wet paper web while voids in the wet paper web are retained.

The wet paper web is made by dispersing the raw material into water or by dispersing the raw material into an organic solvent having surface tension which is smaller than that of water. The wet paper web is dried while the voids in the wet paper web are retained by replacing the moisture contained in the wet paper web with a solvent which is compatible with water and has a surface tension smaller than that of water, or by freeze-drying the moisture remaining in the wet paper web. The organic solvent remaining in the wet paper web evaporates, so that the paper is dried. The wet paper web can be formed into a thin film by a cast-film process. Cellulose which is minute and has a fiber diameter of 1 μm or less is used as the raw material. The minute cellulose is cellulose whose fibers are beaten to a JIS-CSF (JIS P8121) value of 200 ml or less or cellulose whose fibers are beaten to a value of 700 ml or less measured by a modified CSF (wherein 3 g of a sample is measured as 0.3 g of a sample by the method specified in JIS P8121). Alternatively, micro-fibrillated cellulose which is obtained by fraying cellulose fibers by means of a shearing force under high pressure may be also used as the minute cellulose. The mixture of inorganic fillers, such as aluminum borate or potassium titanate, into the wet paper web is also effective. Preferably, a resultant separator has a thickness of 100 μm or less and an airtightness of 1000 sec/100 cc or more.

In accordance with the present invention, the moisture retained in the voids, formed between the cellulose fibers while the paper is in a wet state, is dried by replacing the moisture with a solvent or by freeze-drying. Alternatively, wet paper web is manufactured by dispersing cellulose fibers into an organic solvent, and the thus-manufactured wet paper web is dried by evaporating the organic solvent remaining in the wet paper web. In contrast with the existing papermaking method, it is possible to prevent the adjacent fibers from being strongly attracting to each other and from being brought into close contact with each other by hydrogen bonding, when water evaporates from the wet paper web in the drier process. Consequently, novel highly-airtightened porous paper, which is produced from a reproducible natural resource, i.e., cellulose having superior resistance to heat and chemicals, and has minute pores and a low degree of density. It is possible to manufacture, from minute cellulose fibers having a fiber diameter of 1 μm or less, a highly-air tightened novel porous separator which retains voids in the wet paper web as is and has minute pores, a low degree of density, and denseness. More specifically, a highly-airtightened porous separator which has a thickness of 100 μm or less and an airtightness of 1000 sec/100 cc or more can be retained without increasing the thickness of the separator. In short, a porous separator which has a high degree of airtightness can be obtained, in order to improve the proportion of short-circuit failures and will retain pores to allow the passage of ions, in order to improve the ESR of the separator. Further, since the separator is formed from cellulose fibers, the heat and chemical resistance characteristics required for current industrial products can be improved significantly. As a result, it is possible to provide a highly-reliable non-aqueous battery which is improved to a higher level with regards to various characteristics, e.g., heat resistance, electrical characteristics such as ion transmissivity or liquid-holding characteristics, or prevention of an internal short circuit, through use of a highly-airtightened separator.

In accordance with the present invention, a porous and highly-airtightened separator which has minute pores, a high degree of practicality, and denseness can be formed from cellulose which is a reproducible natural resource. As a result, the reliability of a non-aqueous battery will be improved, and the widespread use of the non-aqueous battery can be promoted. Further, it is possible to increase the application of a porous film manufactured from polyolefine-based resin to the field in which the film has not been used owing to its insufficient heat resistance. More specifically, a porous film having resistance to heat of 230° C. can be made from cellulose. For example, in the case of a lithium-ion battery, there exists a demand for a separator which retains its shape at a temperature of 190° C. or more which is the ignition point of lithium. At present, there are no porous films which have such a heat resistance. Since cellulose is a reproducible natural resource, the conversion of finite petroleum resources to reproducible natural resources can be realized.

EMBODIMENTS OF THE INVENTION

Figure 1:
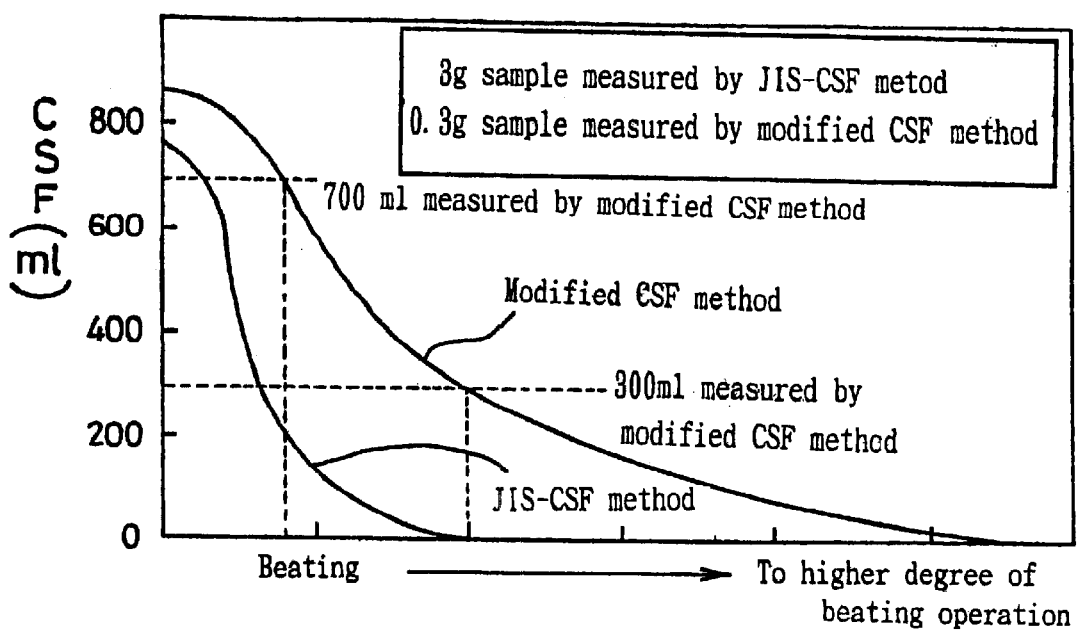
FIG. 1 is a graph showing the relationship between modified CSF in accordance with the present invention and CSF defined by JIS.

Embodiments of a method of manufacturing highly-airtightened porous paper, the highly-airtightened porous paper manufactured by this method, and a non-aqueous battery in accordance with the present invention will be described hereinbelow. The method, in accordance with the present invention is characterized by comprising the steps of manufacturing wet paper web from minute cellulose which is used as a raw material and has a fiber diameter of 1 $\mu$m or less; and drying the wet paper web while voids in the wet paper web are retained, so that highly-airtightened porous paper having minute pores will be formed. Further, the non-aqueous battery which electronically separates a positively-active substance from a negatively-active substance by using a separator, is characterized by the fact that the separator which has minute pores is manufactured by the same steps as forming wet paper web from cellulose, and drying the wet paper web while voids in the wet paper web are retained.

Even in accordance with the existing papermaking method, the airtightness of the separator will be increased by beating cellulose fibers further. However, as previously described, if the cellulose fibers are beaten to a JIS-CSF value of about 200 ml or less and paper is made having a density of about 0.75 g/cm³ or more, voids in the fibers will disappear. As a result, the pores in the separator will become extinct, and the airtightness of the paper will become infinite, thereby disenabling a practical measurement of the airtightness. Even in such a case, the separator has voids while it is in a wet state. In other words, pores are not present in a dry separator, while pores are present in a wet separator before it is dried. Moisture remaining in the wet paper web evaporates through drying, so that cellulose fibers will form hydrogen bonds with each other, in order to break the voids. As a result, the pores disappear. While the paper is in a wet state, voids are present, which hold moisture no matter how much the cellulose fibers are beaten. For example, even if paper is made by beating cellulose fibers to a JIS-CSF value of about 200 ml or less, water can be removed from the wet paper web by pressing. This merely represents the presence of a continuous water-flow path in the wet paper web. The present invention is intended to provide a non-aqueous battery which employs a highly-airtightened porous separator having minute pores by minimizing the influence of water which is exerted on voids in the wet paper web at the time of drying operations, namely, by the drying the wet paper web while the voids or the water flow-path in the wet paper web are maintained.

First, the present invention employs, as raw material, cellulose which has superior resistance to heat and chemicals and is a reproducible natural resource. The cellulose used for the present invention is not limited to cellulose but may be selected from the group comprising: natural cellulose fibers such as soft wood pulp, hardwood pulp, esparto pulp, Manila hemp pulp, Sisal pulp, or cotton pulp; mercerized pulp made from one of these natural cellulose fibers by cold alkaline treatment; or regenerated cellulose fibers such as ordinary rayon fibers, polynosic rayon fibers, or organic solvent fiber-formed rayon fibers. Impurities are removed from the cellulose to be used in advance by a known method such as cleansing, dehydration, or dust removal.

In order to manufacture a separator which has a much higher degree of airtightness, minute cellulose having a fiber diameter of 1 $\mu$m or less will be used as the raw material. This is because the denseness required to achieve an airtightness as high as 1000 sec/100 cc cannot be obtained without the use of minute fibers having a size of 1 $\mu$m or less. More specifically, hardly-beaten cellulose or microfibrillated cellulose (MFC) will be used. In the hardly-beaten cellulose, the profile of the base cellulose fibers is broken, and the external fibrillation of the cellulose fibers proceeds. As a result, the proportion of fibrils having a diameter of about 0.4 $\mu$m is increased, and the fiber diameter is 1 $\mu$m or less. Any cellulose can be used, as the minute cellulose having a diameter of 1 $\mu$m or less used in the present invention, so long as it has a large proportion of fibrils, i.e., it principally comprises fibrils as fibers. Cellulose comprising only fibrils or cellulose partly comprising fibers which are not fibrillated and have a diameter of 1 $\mu$m or more, may also be used as the minute cellulose.

As previously described, the cellulose fibers are not cleaved into two's or three's in a stepwise manner by beating. Fibrils having a diameter of about 0.4 $\mu$m grow stepwise from the outer surface of the fibers, in much the way that whiskers do. Accordingly, natural cellulose fibers cannot be cleaved to reduce the fiber diameter by beating or other means. The extent to which the cellulose fibers are beaten is the state of occurrence of fibrils having a diameter of 0.4 $\mu$m, and the progress in the extent of beating of the cellulose fibers represents an increase in the proportion of fibrils. In the present invention, minute natural cellulose having a high proportion of fibrils is used as the raw material. For example, esparto fibers are natural cellulose fibers, which have a small fiber diameter. However, even the esparto fibers have a fiber diameter of about 10 $\mu$m.

If the minute cellulose which has a fiber diameter of 1 $\mu$m or less, is used as the raw material, the denseness of the resultant separator is increased, and the formation of the separator will become uniform. Consequently, the ESR of the separator is improved. If the raw material which will be further beaten so as to have a fiber diameter of 1 $\mu$m or less is used, the fibers make hydrogen bonds with each other when the separator is dried, so that the pores disappear. As a result, the ESR of the separator becomes considerably deteriorated. Although minute cellulose whose fiber diameter is 1 $\mu$m or less and is smaller than that of conventionally-used fibers is used as raw material in the present invention, a porous separator which maintains pores serving as passage of ions can be manufactured. Therefore, the ESR of the separator can be improved by the synergistic effect of a small fiber diameter and pores.

The cellulose will be beaten to a JIS-CSF value of 200 ml or less or a value of 700 ml or less measured by modified CSF. The extent of the beating is usually measured in the form of a value defined by CSF in JIS (i.e., JIS P8121). However, the extent of the beating is specified by JIS-CSF and modified CSF which is a modification of the JIS-CSF and are used in the present invention as standards for the extent of the beating in order to control airtightness more correctly. The JIS-CSF and the modified CSF used as the standards in the present invention are described hereinbelow.

[JIS-CSF]

Figure 7:
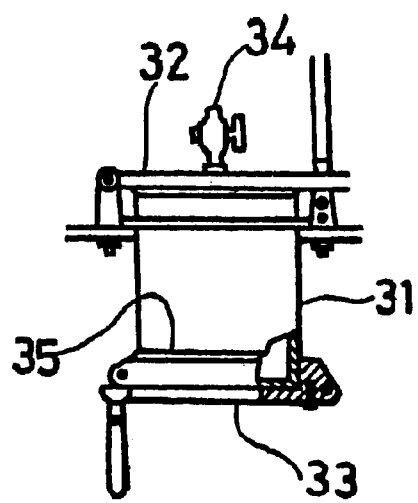
FIG. 7A is a schematic representation illustrating a filter cartridge of an instrument for measuring the degree of beating.
FIG. 7B is a schematic representation illustrating a funnel of the measuring instrument.
FIG. 7C is a schematic representation illustrating a frame of the measuring instrument.
Figure 7:
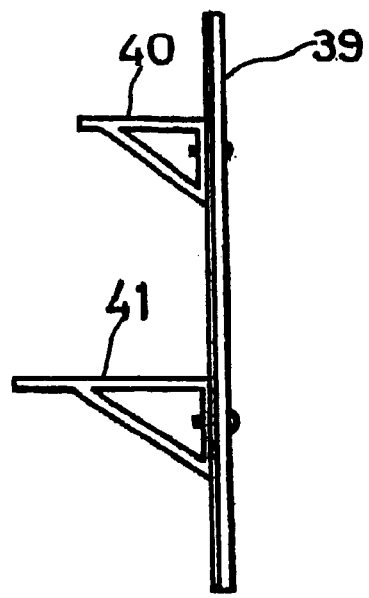
Figure 7:
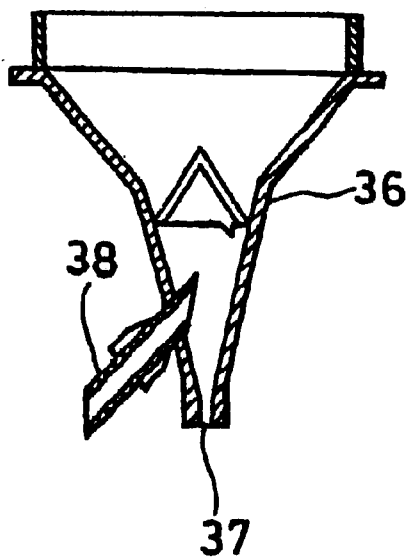

JIS-CSF is the measuring means defined in JIS P8121. Three grams of pulp to be measured is well dispersed into water to thereby accurately produce a sample liquid of 1000 ml. The thus-formed sample liquid is stored in a filter cartridge 31 of a Canadian Standard Freeness Tester shown in FIG. 7A, and a top cover 32 is closed. Next, a bottom cover 33 is opened, and a cock 34 of the top cover 32 is opened, so that filtered water flows to the outside, through an 80-mesh screen, 35 provided in a lower portion of the filter cartridge 31. As a result, fibers are deposited on the 80-mesh screen 35 like a sheet. The sample liquid passes through the sheet-like fibers, and the filtered water enters a funnel 36 which is shown in FIG. 7B and is positioned below the filter cartridge 31. The water then flows from a lower outlet port 37. If a large quantity of filtered water enters the funnel 36 at one time, the filtered water flows not only from the outlet port 37 but also from a side pipe 38 attached to the side of the funnel 36. The water discharged from the side pipe 38 is received by a graduated cylinder, and the amount of the discharged water is taken as a CSF value. FIG. 7C shows a frame 39, and the filter cartridge 31 is provided on an upper rack 40. The funnel 36 is provided on a lower rack 41. The CFS value is measured after the filter cartridge 31 has been placed at a given elevated position and the center of the filter cartridge 31 has been brought into alignment with the center of the funnel 36.

The CSF value is determined by adding the quantity of filtered water resulting from the flow of 1000 ml of a sample liquid, into the funnel 36 from the filter cartridge 31 at one time. If a large amount of filtered water enters the funnel 36 at one time, the total amount of the filtered water cannot be discharged from the lower outlet port 37, so that a build-up of filtered water overflows into the side pipe 38. In contrast, if the filtered water gradually enters the funnel 36, the total amount of filtered water is discharged from the lower outlet port 37, and no filtered water flows into the side pipe 38. In this case, the CSF value is 0 ml. If the fibers are less-hardly beaten, the sheet-like fibers permit the passage of water. Accordingly, the amount of filtered water flowing into the funnel 36 is increased, and the speed of flow of the filtered water becomes faster, thereby resulting in a high CSF value. In contrast, if the fibers are beaten to a greater extent, the sheet-like fibers become difficult to permit the passage of water. Accordingly, the amount of filtered water is reduced, and the speed of the flow of the filtered water becomes slower, thereby resulting in a reduced CSF value.

According to the JIS-CSF, the amount of pulp to be sampled is defined as 3 g. This method is originally intended for measurement of less-hardly beaten pulp. In the case of the papermaking of a low-airtightened separator, the JIS-CSF method represents variations in the extent of the beating in the form of an easily-understandable value and hence it is convenient. However, if the fibers are beaten further, in order to make a highly-airtightened separator, the JIS-CSF value becomes zero at a certain point in time, and hence the extent of the beating of the fibers cannot be ascertained. In order to obtain a highly-airtightened porous separator which is the subject of the present invention, it is essential to continue beating the raw material further, even after the value defined by the JIS-CSF has become zero. To this end, in accordance with the present invention, a modified CSF method, which is based on the JIS-CSF method and will be described later, is used, in order to more accurately measure the extent of the beating of the raw material.

[Modified CSF]

Based on the method specified in JIS P8121, the amount of pulp is changed from 3 g to 0.3 g, and the CSF value is measured. The modified CSF method is the same as the JIS-CSF method with the exception of the amount of pulp to be sampled.

Figure 2:
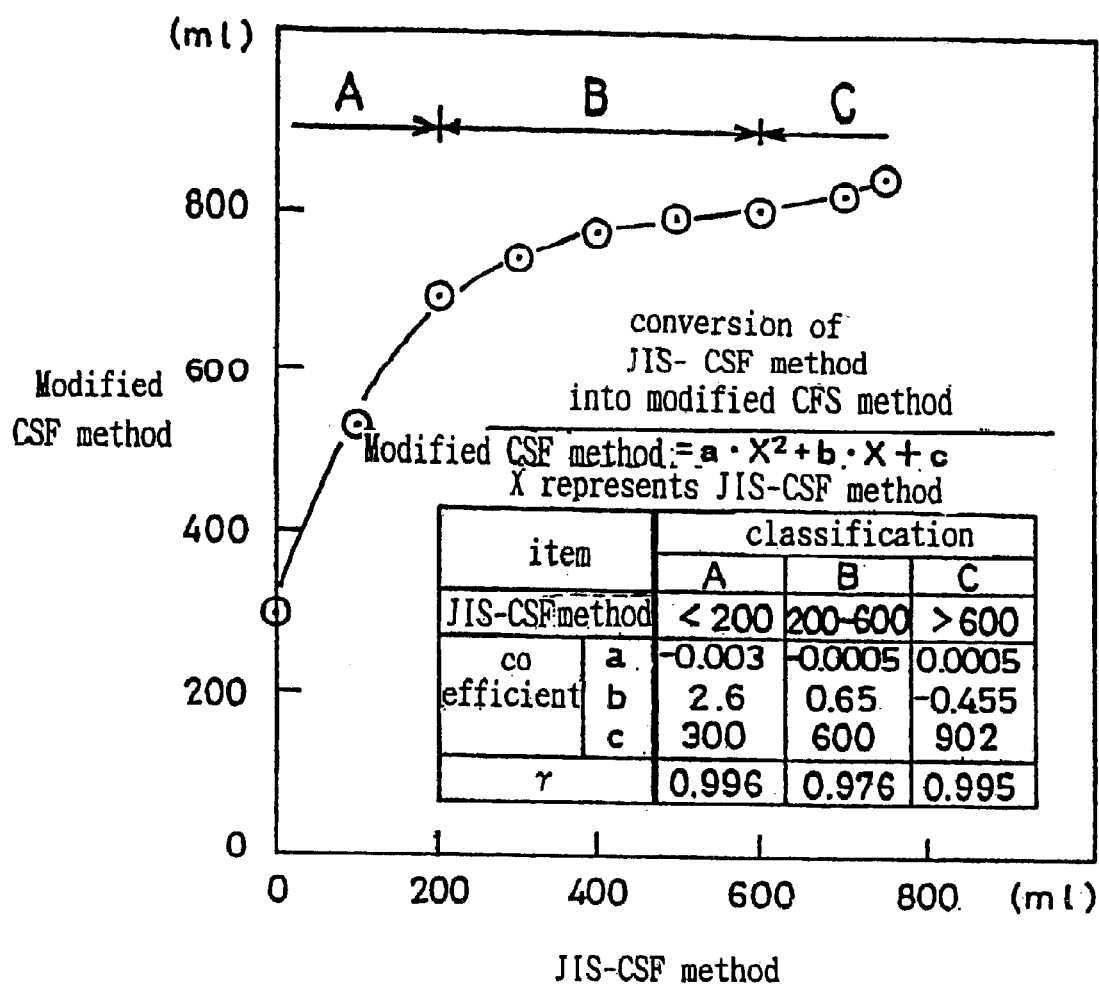
FIG. 2 is a graph showing the relationship between modified CSF in accordance with the present invention and CSF defined by JIS.

In accordance with the modified CSF method, the extent of the beating of the raw material can be ascertained as a CSF, value even if the raw material is beaten to a greater extent. To compare the value measured by the JIS-CSF method with the value measured by the modified CSF method, a graph shown in FIG. 1 illustrates variations in the JIS-CSF value and variations in the modified CSF value obtained when the raw material is beaten further. In a graph shown in FIG. 2, the vertical axis represents the value obtained by the modified CSF method, and the horizontal axis represents the value obtained by the JIS-CSF method. As shown in FIG. 1, a value of 700 ml obtained by the modified CSF method corresponds to a value of 200 ml obtained by the JIS-CSF method, and a value of 300 ml obtained by the modified CSF method corresponds to a value of 0 ml obtained by the JIS-CSF method, where the extent of beating cannot be further measured in the form of a CSF value. As shown in FIG. 2, the value measured by the JIS-CSF method greatly changes in the phase in which the raw material is less-hardly beaten, i.e., in the range of a JIS-CSF value of 200 ml or more (i.e., in the range of 200 to 800 ml). In contrast, the value measured by the modified CSF method does not change substantially. In this phase, in comparison with the modified CSF method, the JIS-CSF method enables easy ascertainment of the extent of the beating of the raw material. Conversely, in the phase in which the raw material is beaten to a certain extent, i.e., when the JIS-CSF value becomes 200 ml or less, the value measured by the modified CSF method greatly changes, which makes it easy to ascertain the extent of the beating. Even when the JIS-CSF value becomes 0 ml, the value measured by the modified CSF method still represents 300 ml. If the raw material is beaten to a further extent, it is impossible for the JIS-CSF method to measure the extent of the beating of the raw material. In contrast, it is still possible to measure the extent of the beating by the modified CSF method in the form of a numerical value.

The value measured by the modified CSF method will be converted into a value in compliance with the JIS-CSF method through use of a conversion expression shown in FIG. 2. As shown in FIG. 2, the conversion expression employs a different coefficient in each of the three zones, i.e., a zone of a value of 200 ml or less, a zone of the value ranging from 200 ml to 600 ml, and a zone of a value ranging from 600 ml to 800 ml. In Table 7, "γ" represents a correlation coefficient and the match between a practically-measured value and the modified CSF value which is calculated from the JIS-CSF value by means of the conversion expression.

In the modified CSF method, since the amount of pulp to be sampled is reduced to 1/10 of the amount of pulp required for the JIS-CSF method, i.e., 0.3 g, the absolute amount of pulp is reduced, and the concentration of the sample liquid is also reduced. As a result, in comparison with the value measured by the JIS-CSF method, the value measured by the modified CSF method become larger. For example, if the pulp beaten to a JIS-CSF value of 0 ml is measured through the use of the amount of pulp, i.e., 3 g, the viscosity of the sample liquid becomes high, and fibers are densely formed in small amount in the form of a sheet on a 80-mesh screen 35, thereby terminating the flow of the filtered water. Therefore, it becomes impossible to measure the extent of the beating, of further-beaten pulp by the CSF method. In contrast, the viscosity of the sample liquid is low at an amount of 0.3 g in accordance with the modified CSF method, and a given amount of filtered water flows into the funnel 36 from the filter cartridge 31 before fibers are formed in the form of a sheet on the 80-mesh screen 35. Accordingly, the amount of the filtered water overflowed from the side pipe 38 can be measured. Consequently, the CSF value of the pulp which is further beaten to a JIS-CSF value of 0 ml or less can be measured by the modified CSF method.

In order to make the raw material into minute cellulose whose fiber diameter is 1 μm or less by producing fibrils, it is necessary to hardly beat the cellulose to the extent of a JIS-CSF value of 200 ml or less or a modified-CSF value of 700 ml. In response to the desired degree of airtightness, the cellulose is beaten within the modified-CSF value ranges from 700 ml to 0 ml.

Further, micro-fibrillated cellulose (MFC) which is obtained by fraying cellulose fibers by means of a shearing force under high pressure, may be also used as the minute cellulose without beating the cellulose. MFC known by the tradename Cerish KY-110S (produced by Daicel Chemical Industries Ltd.) is commercially available. Baceterial cellulose which is not industrially used at present may be also used as MFC. The bacterial cellulose is produced by bacterium and has the fiber diameter ranging from nanometers to tens of nanometers.

Wet paper web is manufactured by dispersing, into water, a minute cellulose beaten to a predetermined extent so as to have a fiber diameter of 1 μm or less or micro-fibrillated cellulose, through use of a papermaking machine. A Fourdrinier machine is used for the minute cellulose having a fiber diameter of 1 μm or less. By using of a cylinder machine and the Fourdrinier machine in combination, a plurality of sheets of wet paper web formed from less-hardly beaten raw material by the cylinder machine are stacked into layers by the Fourdrinier machine, which is also effective to improve the strength of the produced highly-airtightened porous paper. In any event, it is necessary for the wet paper web to include at least one layer of paper formed from hardly-beaten raw material by the Fourdrinier machine.

A film serving as wet paper web can be made, by casting dope including cellulose fibers on a plane plate as raw material by means of a doctor blade, or the like, without using a papermaking machine as the means for manufacturing the wet paper web. The wet paper web in this invention includes a wet film made by the cast process.

Even if the wet paper web is thus manufactured from fibrillated minute cellulose which is beaten to a modified-CSF value of 700 to 0 ml and has a fiber diameter of 1 μm or less, the paper still retains voids between cellulose fibers while moisture is trapped in the voids. The present invention is directed to the drying of the wet paper web while the voids are maintained. To this end, the wet paper web is dried by replacing the water trapped in the voids of the wet paper web with another solvent having surface tension smaller than that of water. A solvent which is compatible with water and has a small surface tension is suitable for use in solvent replacement drying. In general, a suitable solvent comprises alcohol such as methyl alcohol, ethyl alcohol, or isopropyl alcohol, or ketones such as acetone or methyl-ethyl-ketone. Water is replaced with a solvent by immersion-and-press-drainage, or spray-drainage. The replacement of water with a solvent is performed once or several times depending on the desired airtightness. The water may be replaced with a solvent while the wet paper web is held in the papermaking machine or in another process after the wet paper web has been taken up from the papermaking machine as is. Preferably, excessive moisture is removed from the thus-manufactured wet paper web by a press roller before it is subjected to the solvent replacement.

An important point to note when replacing water with a solvent is that water should be removed by replacing it with a solvent before the evaporation of water causes fibers to make hydrogen bonds to each other. Particularly, in the case of a separator which has been made from hardly beaten raw material, in order to have a film-like appearance and a density of 0.75 g/cm$^3$ or more, once the separator has been dried, cellulose fibers make tight hydrogen bonds. Even if the separator is immersed in water, the separator swells but it is difficult to return to the state of the wet paper web held in the papermaking machine. If dry paper is immersed in water and the thus-immersed paper is dried by replacing water with a solvent, the resultant paper will be inferior in ESR to the paper which is dried by replacing moisture with a solvent while the wet paper web is held in the papermaking machine or by replacing moisture with a solvent through use of another machine, after the wet paper web has been taken up. For this reason, in a case where wet paper web is taken up from the papermaking machine and is subjected to solvent replacement in another process, the wet paper web must contain moisture sufficient to prevent the hydrogen-bonding of fibers which would otherwise be caused by evaporation.

Freeze-drying may be applied in place of the solvent replacement drying. The freeze-drying is a method in which the wet paper web is dried by freezing it and subliming frozen moisture under reduced pressure. The reason the frozen ice is sublimed under reduced pressure after the wet paper web has been frozen is that it is impossible to prevent the hydrogen bonding of cellulose fibers owing to the influence of water and to maintain the voids in the wet paper web if the wet paper web is dried after the frozen moisture has melted.

The solvent still remaining in the wet paper web after water has been replaced with the solvent or the moisture still remaining in the wet paper web after it has been freeze-dried is obviated by the drying. The paper may be dried by means of an existing drum drier or through the use of an air blow or infrared rays.

Alternatively, wet paper web may be manufactured by dispersing minute cellulose having a fiber diameter of 1 μm or less into an organic solvent having surface tension smaller than that of water by means of the papermaking process or cast process without the use of water from the beginning.

In a case where the highly-airtightened porous paper of the present invention is used as a battery separator, a separator used in an electrolytic capacitor, or various filters, it is effective to add inorganic fillers, such as aluminum borate or potassium titanate, into cellulose fibers at the time of manufacture of the highly-airtightened porous separator in response to the desired electrical characteristics or the filtering characteristics required when the paper is used as a filter. This is because an inorganic filler originally does not make hydrogen bonds to cellulose fibers even if there is water between them. Further, since large voids are present in the wet paper web, the electrical characteristics or filtering characteristics of the highly-airtightened porous paper can be improved.

A highly-airtightened porous separator can be manufactured by controlling the degree of airtightness by means of a combination of the previously-described raw material, the wet paper web manufacturing method, the drying method, the thickness of the separator, the density of the separator, or the like. The thus-manufactured highly-airtightened porous separator will have the same voids as those formed in the wet paper web. Therefore, the highly-airtightened porous paper has minute pores and a high degree of airtightness corresponding to the extent of the beating of the cellulose fibers. Even if the cellulose fibers used as raw material are beaten to a JIS-CSF value of 200 ml or less or to the modified CSF value ranging from 700 to 0 ml, the separator retains minute pores corresponding to the extent of beating, thereby preventing the airtightness of the separator from becoming infinite. More specifically, there is produced a highly-airtightened porous separator which cannot be manufactured in the prior art, i.e., a highly-airtightened porous separator which has a thickness of 100 μm and an airtightness of 1000 sec/100 cc.

Figure 4:
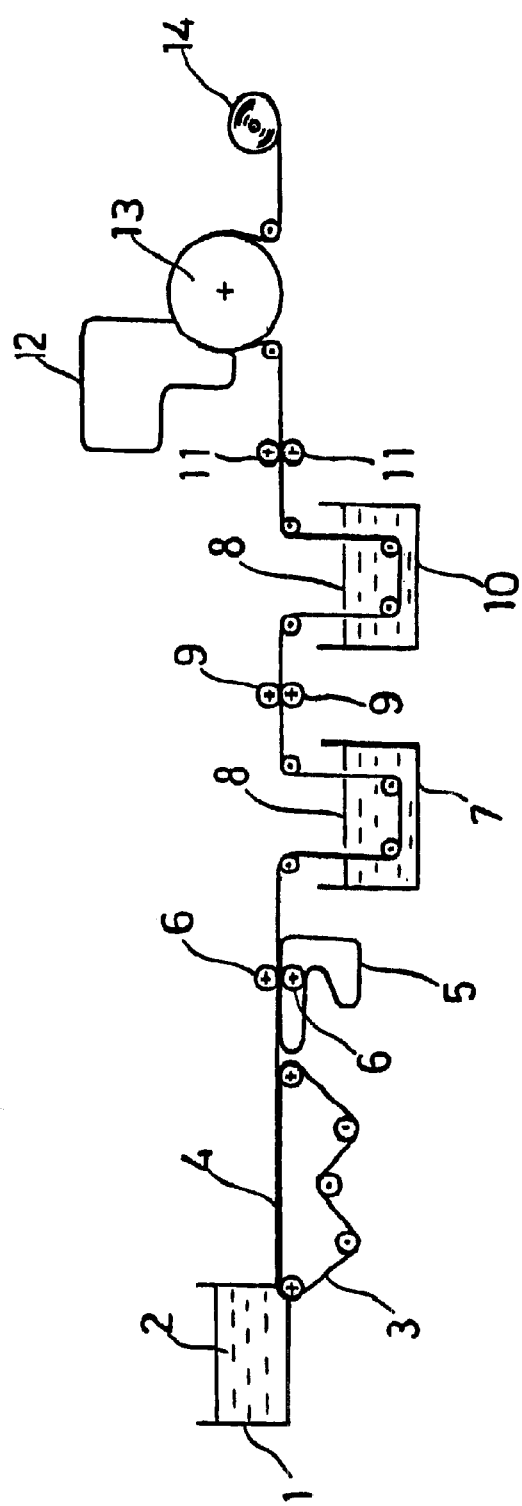
FIG. 4 is a schematic representation illustrating an example of the method in accordance with the present invention in which a separator is manufactured by replacing of a solvent with water.

A method of manufacturing a separator from the highly-airtightened porous paper in accordance with the present invention, will now be described. First, cellulose fibers used as raw material are beaten to a predetermined JIS-CSF value or a modified CSF value by a papermaking machine such as a beater or a double disk refiner. As shown in FIG. 4, the thus-beaten cellulose fibers are stored as a paper stock in an inlet 1, and the paper stock is fed to the surface of a wire belt 3 which rotates below the inlet 1, to thereby form continuous wet paper web 4 on the surface of the wire belt 3. The thus-produced wet paper web 4 is transferred to a wet felt 5, and excessive moisture is removed by press rollers 6. Subsequently, the wet paper web 4 is immersed in a solvent bath 7 which holds a predetermined solvent 8 to thereby replace the moisture in the wet paper web 4 with the solvent 8. The excessive solvent 8 is then removed by press rollers 9, and the wet paper web 4 is again immersed in a second solvent bath 10 which holds the solvent 8 to thereby replace the moisture remaining in the wet paper web 4 with the solvent 8. The excessive solvent 8 is removed by press rollers 11, and the wet paper web 4 is transferred to a dry felt 12, where the wet paper web 4 is dried by coming into contact with the outer surface of a cylindrical drier 13 heated by steam or a heating medium. The thus-dried paper 4 is taken up by a take-up roller, whereby a highly-airtightened porous separator 14. In this drier process, the paper does not include an adequate amount of moisture which bonds together the cellulose fibers by hydrogen bonding to thereby break voids, and the moisture has already been replaced with the solvent. Consequently, it is possible to manufacture a highly-airtightened porous separator which retains the voids formed in the wet paper web as it is after the paper has been dried. In the example shown in FIG. 4, wet paper web is manufactured by the Fourdrinier machine, and the moisture in the wet paper web is replaced with a solvent within the machine. The paper is taken up after it has been dried.

Figure 5:
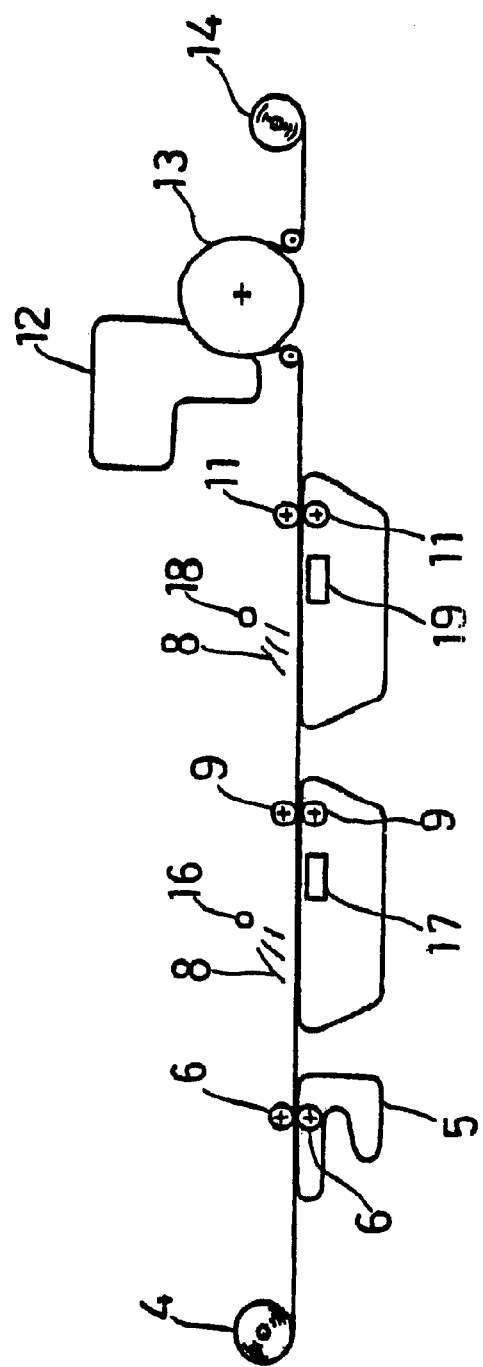
FIG. 5 is a schematic representation illustrating another example of the method in accordance with the present invention in which a separator is manufactured by replacing of a solvent with water.

In the example shown in FIG. 5, the moisture included in the wet paper web 4 is replaced with the solvent by spraying the solvent 8 on the wet paper web 4 instead of immersing the wet paper web 4 in the solvent 8. The constituent elements which are the same as those shown in FIG. 4 will be assigned the same reference numerals, and their explanations will be omitted here, for brevity. FIG. 5 shows the example in which the wet paper web 4 manufactured by the Fourdrinier machine is similar to that shown in FIG. 4, is taken up while it is in a wet state (i.e., the wet paper web is subjected to wet winding), and the moisture in the wet paper web is replaced with the solvent by means of another machine. More specifically, the wet paper web 4 is taken up in a rolled state and is transferred to the wet felt 5, and excessive moisture is removed from the wet paper web 4 by the press rollers 6. The solvent 8 is sprayed on the wet paper web 4 by a first solvent sprayer 16, whereby the moisture in the wet paper web 4 is replaced with the solvent 8. The thus-sprayed solvent 8 is sucked by a suction extractor 17, and the excessive solvent 8 is removed from the wet paper web 4 by the press rollers 9. The solvent 8 is again sprayed on the wet paper web 4 by a second solvent sprayer 18, so that the moisture remaining in the wet paper web 4 is replaced with the solvent 8. The thus-sprayed solvent 8 is sucked by a suction extractor 19, and the excessive solvent is removed from the wet paper web 4 by the press rollers 11. After this process, the paper 4 is subjected to the same processing as it is in the example shown in FIG. 4. As described above, the moisture in the wet paper web may be replaced with a solvent within the papermaking machine or by means of another machine. Although moisture is replaced with the solvent twice by immersing the wet paper web in the solvent or by spraying the solvent on the wet paper web, the number of times moisture is replaced with the solvent may be changed in accordance with the type of the solvent, the raw material, or manufactured wet paper web, as required.

Figure 6:
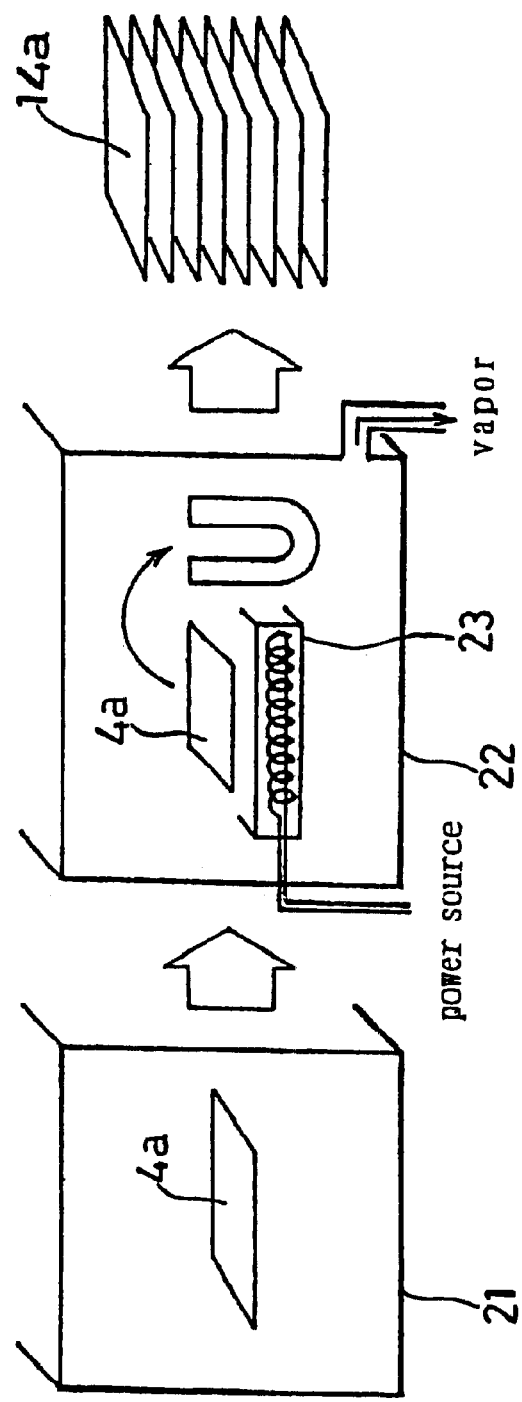
FIG. 6 is a schematic representation illustrating the method in accordance with the present invention in which the separator is manufactured by freeze-drying.

FIG. 6 shows an example, where wet paper web is dried while voids in the wet paper web are maintained by freeze-drying instead of by replacing moisture with a solvent. First, the wet paper web 4 is frozen at a temperature of −70° C. in a refrigerator 21 to thereby produce the frozen wet paper web 4a. The thus-frozen wet paper web 4a is stored in a freeze dryer 22, and the air in the freeze dryer 22 is evacuated to create a depressurized condition. The frozen moisture included in the frozen wet paper web 4a sublimes as a result of the reduction in pressure to thereby dehydrate the paper, whereby a highly-airtightened porous separator 14a is manufactured. Preferably, a heat-up rack 23 will be provided in the freeze dryer 22 in order to promote the sublimation of the frozen moisture, and the frozen paper 4a is placed on the heat-up rack 23. The important point to note at this time is that the paper is dried by subliming the frozen ice without returning it to water.

In a case where the paper is manufactured from the cellulose beaten to the value specified in the present invention and is dried by the existing papermaking method, a multiple-drum drier will be necessary. However, in a case where the paper's moisture will be replaced by a solvent, and dried, as in the present invention, a single-drum drier is sufficient. When water evaporates from the wet paper web by the existing papermaking method during the drier process, fibers are attracted to each other as meniscus disappears, thereby resulting in cockles (or cockles owing to the drying operation). To prevent cockles, the wet paper web must be gradually dried by a multiple-drum drier. In the case of the present invention, since the paper does not include moisture which would cause cockles when it is dried, and the solvent used as a replacement easily disappears, the paper can be dried through the use of a single-drum cylinder. The drier is not limited to an existing drum drier, and various types of drying methods, such as an infrared drier or an air-blow drier, can be utilized.

Preferably, the thus-manufactured separator will have a thickness ranging from 15 to 100 μm. In the case of separators which have a thickness of less than 15 μm, they have reduced mechanical strength and are difficult to handle. In contrast, in the case of separators having a thickness of 100 μm or more, they cannot be reduced in size, and the electrical resistance of the separator is increased so as to correspond to an increase in the thickness. In the case of a coin battery, the risk of occurrence of short circuit at the time of press molding increases unless the separator has a certain thickness. For this reason, the coin battery is required to have a thickness of up to 100 μm. In contrast, although there is no particular limitation to the density of the separator, a density of 0.3 to 0.6 g/cm$^3$ is practically preferable. In a case of the separator having a density of less than 0.3 g/cm$^3$, the tensile strength of the separator is considerably reduced.

Such a separator is not practical when used as a separator in a non-aqueous battery. The separator manufactured by the present invention retains voids and hence does not have a density of 0.6 g/cm$^3$ or more. In a case where the thickness of the separator is restricted in practice, it is preferable that the density of the separator be set to a value ranging from 0.6 to 0.8 g/cm$^3$ by reducing the thickness of the separator by means of calendering.

The electrolytic compound used in the non-aqueous battery which employs the foregoing separator is a dissolved mixture of one or two substances or more, selected from the group comprising: propylene carbonate, ethylene carbonate, dimethyl carbonate, diethyl carbonate, methyl-ethyl-carbonate, 1,2-dimethoxyethane, 1,2-diethoxyethane, γ-butyrolactone, tetrahydrofuran, 2-methyltetrahydrofuran, 1,3-dioxolane, sulfolane, methylsulfolane, acetonitrile, plopylonitrile, methyl formate, ethyl formate, methyl acetate, or ethyl acetate.

The electrolytic fluid used in the non-aqueous battery of the present invention is a mixture of one substance or two substances or more selected from the group comprising: lithium salts such as $LiClO_4$, $LiAsF_6$, $LiPF_6$, $LiBF_4$, $CH_3SO_3Li$, $CF_3SO_3Li$, or $(CF_3SO_2)_2NLi$.

The positively-active substance of the non-aqueous battery of the present invention uses any one selected from the group comprising: metal chalchogen compounds such as $TiS_2$, $MoS_2$, or NbSe; lithium-contained composite metal oxides, such as $LiCoO_2$, $LiNiO_2$, or $LixMnO_4$, high polymers, such as polyaniline, or polypyrrole; or fluorocarbon. Particularly preferable are lithium-contained composite metal oxid, a positively-active substance which can be used for doping lithium ions or can be removed from doped lithium ions and is represented by a general formula such as $Li_xM_yN_zO_2$ (where M is at least one of transition metals, and N is at least one of non-transition metals. M is not particularly limited but includes Co, Ni, Fe, Mn, V, Mo, or the like. Similarly, N is not particularly limited but includes Al, In, Sn, or the like.). More specifically, examples of the metal lithium-contained composite metal oxides are represented by the chemical formula while they are in a discharge state and include Li ions, as shown below:

Lithium cobalt oxides→e.g. $Li_xCo_yN_zO_2$ (N is at least one type of metal selected from the group comprising Al, In, or Sn. $0<x\leq 1.1$, $0.5<y\leq 1$, $z\leq 0.1$, $Li_xCoO_2$ ($0<x\leq 1$), $Li_xCo_yNi_zO_2$ ($0<x\leq 1$, y+z=1);

Lithium nickel oxides→e.g., $Li_xNiO_2$ ($0<x\leq 1$);

Lithium manganese oxides→e.g., $Li_xMnO_2$, $Li_xMn_2O_4$ ($0<x\leq 1$), $LiCo_xMn_2-xO_4$ ($0<x\leq 0.5$);

Lithium chromium oxides→e.g., $Li_xCr_3O_8$ ($0<x\leq 1$), $LiCrO_2$;

Lithium vanadium oxides→e.g., $Li_xV_2O_5$ ($0<x\leq 1$); $Li_xV_6O_{13}$ $Li_{1+x}V_3O_8$;

Lithium molybdenum oxides→e.g., $Li_xMoO_2$;

Lithium molybdenum disulfides→e.g., $Li_xMoS_2$;

Lithium titanium oxides→e.g., $Li_xTi_2O_4$;

Lithium titanic sulfates→e.g., $Li_xTi_2S_2$; or

Lithium iron oxides→e.g., $Li_xFeO_2$ ($0<x\leq 1$), $Li_xFe_yN_zO_2$ (N is at least one type of metal selected from the group comprising C, Ni, Ti, or Mn. $0<x\leq 1$, $0.8\leq y\leq 0.99$, $0.01\leq z\leq 0.2$).

Of lithium metal oxides, lithium cobalt oxides, lithium nickel oxides, lithium manganese oxides, or lithium iron oxides are particularly preferable.

The negatively-active substance used in the non-aqueous battery of the present invention employs at least one substance selected from the group comprising: lithium metals; lithium alloys such as LiAl; carbonaceous materials; conductive polymeric materials such as polyacenes, or poly-P-phenylenes; or metal oxides such as $Li_xFe_2O_2$, or $Li_xWO_2$. Carbonaceous materials such as graphites, pyrolytic carbons, pitch cokes, needle cokes, petroleum cokes, or calcined polymeric organic substances (e.g., calcined substances composed of such as phenolic resin, furan resin, or polyacrylonitrile), are particularly preferable which are the negatively-active substances capable of doping lithium ions or being removed from the doped lithium ions.

EXAMPLES

The following are various examples of highly-airtightened porous separator and the non-aqueous battery which are manufactured by taking up the separator interposed between the positive and negative electrodes in the form of a battery element and by sealing the battery element after it has been immersed in an electrolyte. Further, comparative examples of an existing non-aqueous battery manufactured for the purpose of comparison are shown below. The method of manufacturing the non-aqueous battery and the method of measuring the embodiments and the comparative examples are as follows. Further, the JIS-CSF measurement method and the modified CSF measurement method are as previously described.

(1) Method of Manufacturing the Positive Electrode

After 100 wt. % Li·Co composite oxide which has the chemical composition of $Li_{1.03}Co_{0.92}Sn_{0.02}O_2$, 2.5 wt. % graphite, and 2.5 wt. % acetylene black have been mixed together, 2 wt. % fluororubber has been dissolved into 60 wt. % mixed solvent of ethylacetate/ethylcellosolve having a weight ratio of 1:1, whereby a slurry coating fluid was obtained. The coating fluid which has an amount of 270 g/m$^2$ (Its weight after the fluid has been dried) is applied to a thickness of 215 μm on each side of the aluminum foil measuring 600 mm in width and 15 μm in thickness, by using a coating machine having a doctor blade coater head. The thus-coated aluminum foil is pressed by calender rollers and slit into strips, each of which have a width of 39 mm, through use of a slitter. The thus-formed aluminum strip will be used as the positive electrode of the non-aqueous battery.

(2) Method of Manufacturing the Negative Electrode 100 wt. % needle cokes and 5 wt. % fluororubber dissolved into 60 wt. % mixed solvent of ethylacetate/ethylcellosolve having a weight ratio of 1:1 is mixed together, to thereby produce a slurry coating fluid. The coating fluid which has an amount of 138 g/m$^2$ (which is a weight after the fluid has been dried) is applied to a thickness of 300 μm on each side of a copper foil measuring 600 mm in width and 10 μm in thickness, by using a coating machine having a doctor blade coater head. The thus-coated copper foil is pressed by calender rollers and is slit into strips, each of which having a width of 40 mm, through use of a slitter. The thus-formed aluminum strip is used as the negative electrode of the non-aqueous battery.

(3) Manufacture of the Non-aqueous Battery

The thus-manufactured positive and negative electrodes are stacked on the respective sides of the separator, and the thus formed-laminate is wound into a coil, having an outer diameter of 14.9 mm. This coil is inserted into a jacket having an outside diameter of 16 mm. $LiBF_4$ having a concentration of 1 M is dissolved into a mixed solvent consisting of propylene carbonate/ethylene carbonate/γ-butyrolactone (having a weight ratio of 1:1:2) to thereby produce an electrolyte, and the coil is sealed after it has been immersed into this electrolyte. As a result, a non-aqueous battery, 50 mm in height is manufactured.

(4) Thickness, Density, and Tensile Strength of the Separator

The thickness, density, and tensile strength of the separator are measured by the method defined in the former JIS C2301 (Electrolytic Capacitor Papers).

(5) Airtightness of the Separator

The airtightness of the separator is measured in accordance with the section "12. 1 Airtightness" defined in JIS C2111 (Testing Methods of Electhical Insulating Papers, Pressboad and Presspaper) through use of a type-B tester (a Gurley densometer), where an adaptor having a hole measuring 6 mm in diameter was used.

(6) ESR of the Separator

The ESR of the separator was measured at a frequency of 1 kHz using an LCR meter after the separator had been immersed into the electrolyte and sandwiched between electrodes having a diameter of 38 mm.

(7) Capacity of the Non-aqueous Battery

The capacity of the battery is measured by discharging it at a current of 0.5 A at a temperature of 20° C.

(8) Proportion of Short-circuit Failures of the Non-aqueous Battery

The proportion of short-circuit failures is represented by the ratio of insulation failures which occurred in the separator at an early stage of the assembly of the non-aqueous battery, i.e., a ratio of the number of faulty batteries which cause insulation failures to the total number of measured batteries. To evaluate the heat resistance of the non-aqueous battery, the ratio of short-circuit failures owing to heat is represented by a ratio of the number of faulty batteries which cause insulation failures to the total number of measured batteries after the non-aqueous batteries have been left in an oven at a temperature of 200° C. for ten minutes.

Example 1

In example 1, wood pulp (NUKP: Needleholt Unbleached Kraft Pulp) was hardly beaten to a modified CSF value of 50 ml through use of a double disk refiner. This wood pulp was dispersed into water, and wet paper web was manufactured by the Fourdrinier machine. The wet paper web was taken up in the form of a roll after excessive moisture had been removed from the wet paper web using press rollers. As shown in FIG. 4, the rolled wet paper web was immersed into ethyl alcohol to thereby replace moisture in the wet paper web with ethyl alcohol twice. The ethyl alcohol and remaining water were dried by a drier, so that highly-airtightened porous paper having a thickness of 30.3 $\mu$m and a density of 0.508 g/cm$^3$ was manufactured.

Comparative Examples 1 and 2

The wet paper web was dried by the ordinary papermaking method through use of a drier without replacing the moisture in the wet paper web manufactured in the example 1 with ethyl alcohol, whereby paper having a thickness of 20.8 $\mu$m and a density of 0.745 g/cm$^3$ was manufactured. In comparative example 2, the raw material used in the example 1 was beaten to a modified CSF value of 780 ml in order to manufacture paper which has nearly the same thickness and density as the paper manufactured in example 1. Wet paper web was manufactured by the cylinder machine, and the moisture in the wet paper web was dried by the ordinary papermaking method, through use of a drier. The manufactured paper, has a thickness of 30.2 $\mu$m and a density of 0.513 g/cm$^3$. Table 1 shows the airtightness, or the like, of the paper thus formed in the example 1 and comparative examples 1, 2.

In the example 1, the unbleached Kraft pulp is used as a raw material, i.e., cellulose, and therefore the resultant paper should have a brownish appearance. However, in practice, the paper has a white opaque appearance. The reason the paper has a white opaque appearance, is that the voids in the wet paper web are maintained, as a result of the wet paper web being dried by replacing moisture with a solvent, and the voids cause irregular reflection. The airtightness of the paper manufactured in the example 1 is 3250 sec/100 cc, and hence the paper has a high degree of denseness. However, as can be seen from the passage of the air, it is ascertained that the voids are indeed present in the paper. In other words, an airtightness of 1000 sec/100 cc which is impossible to achieve by the existing method is accomplished. Further, the paper has a thickness of 30.3 $\mu$m and a density of 0.508 g/cm$^3$. In spite of the fact that the cellulose is hardly beaten to a modified CSF value of 50 ml, the paper of example 1 has a density which is considerably smaller than that of the paper manufactured in the comparative example 1. Since the moisture in the wet paper web is not replaced with the solvent in the comparative example 1, the thickness of the paper is 20.8 $\mu$m which is smaller than that of the paper manufactured in example 1 in spite of the fact that the paper of the comparative example 1 is manufactured from the same wet paper web as used in example 1. Further, the paper manufactured in the comparative example 1 has a density of 0.745 g/cm$^3$ which is larger than that of the paper manufactured in example 1 and has a brownish appearance and the shape of a film. Further, no pores are formed in the paper, and the airtightness of the paper is infinite and impossible to measure. Although the paper is manufactured from the same material both in the example 1 and the comparative example 1, there is a significant difference in thickness and density between the paper produced in the example 1 and the paper produced in the comparative example 1. The reason for this is that the wet paper web formed in the comparative example 1 was dried without replacing the moisture with the solvent, and evaporation of water having surface tension, caused the fibers to attract, so that the fibers made strong bonds to each other. In contrast, in example 1 where the wet paper web was dried by replacing the moisture with the solvent, the attraction of fibers which would be caused by the evaporation of the moisture did not occur. Therefore, the paper manufactured in the example 1 has a low density. Consequently, in accordance with example 1, it is possible to manufacture highly-airtightened porous paper having pores, a low density, and denseness even when the hardly beaten material is used.

When paper manufactured in the comparative example 2 which has nearly the same thickness and density as paper manufactured in example 1 is compared with the paper manufactured in example 1, it is acknowledged that the paper manufactured in the comparative example 2 has an airtightness of 2.5 sec/100 cc and pores but does not have denseness. Consequently, it is impossible to attain desired airtightness in the comparative example 2. The reason for this is that the fibers loosely attracted each other owing to a large diameter of the less-hardly beaten fibers at the time of evaporation of the water having large surface tension.

Examples 2 through 8

Figure 3:
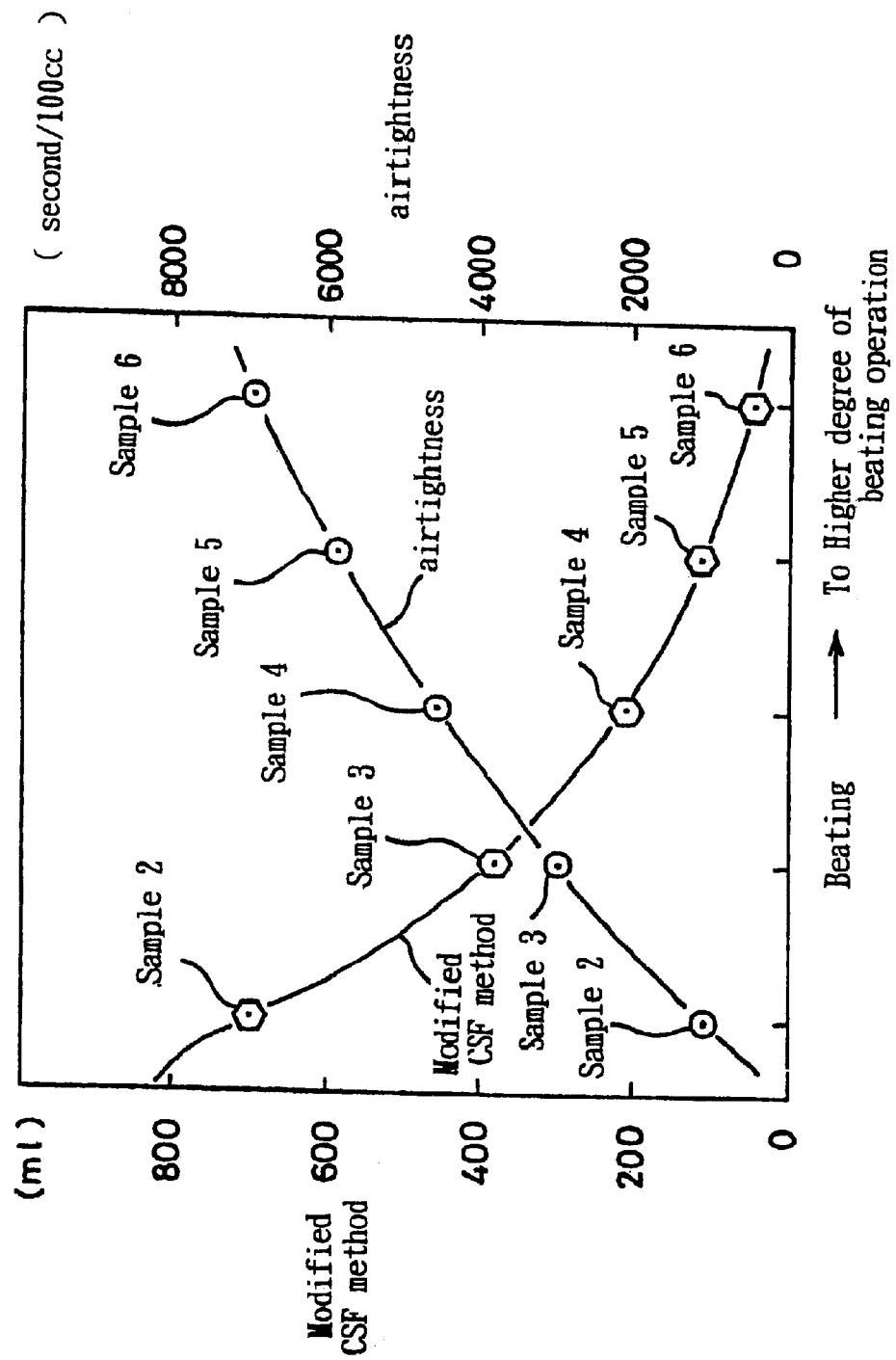
FIG. 3 is a graph showing the relationship between the value of the modified CSF and airtightness.

In examples 2 through 6, Manila hemp pulp was beaten within the range of modified CSF values from 700 ml to 50 ml through use of a double disk refiner. The thus-prepared materials were dispersed into water, and wet paper web was manufactured by the Fourdrinier machine. As shown in FIG. 5, acetone was sprayed on the surface of the wet paper web twice, to thereby replace moisture in the wet paper web with acetone. The acetone and the remaining water were dried by the drier, so that highly-airtightened porous separators as represented in examples 2 through 6 were manufactured. In example 7, the wet paper web manufactured from the same material as that used in example 6, was dried by subliming the frozen ice of the paper under a reduced pressure after having frozen the paper by a freeze-drying method shown in FIG. 6. This was done instead of replacing the moisture in the wet paper web with the solvent, as in the examples 2 to 6. The water remaining in the wet paper web was dried with the drier. In example 8, the material was prepared in the same way as it was the material in example 6, and 10 wt.% aluminum borate, which is an inorganic filler, was added to the material. A separator was manufactured from this material by the same method as the one used in example 6. Table 2 shows the thickness, density, airtightness, and ESR of the separators manufactured in the examples 2 through 8. FIG. 3 is a graph showing the relationship between the extent of the beating and airtightness of the separators of examples 2 through 6.

As shown in Table 2, the separators of examples 2 to 6 have thicknesses of around 50 μm and densities around 0.500 g/cm³. As the cellulose is beaten to a greater extent, the denseness of the resultant separator increases. In any case, the separators have airtightness as high as 1000 sec/100 cc. However, even if the cellulose is beaten hard, the airtightness of the separator does not increase to such an extent that it is impossible to measure. Example 2 uses the raw material beaten to a modified CSF value of 700 ml (corresponding to a JIS-CSF value of 200 ml), and the airtightness of the separator is 1100 sec/100 cc. The separator has an opaque appearance. The reason the paper has an opaque appearance is that the voids in the wet paper web are maintained, as a result of the wet paper web being dried by replacing moisture with a solvent, and the voids cause irregular reflection. If the cellulose is further beaten to a modified CSF value of 700 ml (corresponding to a JIS-CSF value of 200 ml), the original profile of the cellulose fibers is broken, and external fibrillation of the cellulose proceeds. The proportion of fibrils which have a diameter of about 0.4 μm is increased. To accomplish airtightness of 1000 sec/100 cc or more, it is acknowledged that the cellulose fibers are beaten until the profile of the original cellulose fibers disappears, or until the modified CSF value reaches a value of 700 ml (corresponding to 200 ml according to the JIS method).

In the example 6, the cellulose fibers are beaten to a modified CSF value of 50 ml (which is impossible to measure in accordance with the JIS-CSF method), and the airtightness of the separator is 7000 sec/100 cc. Consequently, even if the cellulose fibers are beaten to a JIS-CSF value of 200 ml or less where the airtightness of the separator becomes infinite and impossible to measure in the background art, it is acknowledged that there exist pores which permit the passage of ions. As described above, in accordance with the present invention, even if the cellulose fibers are beaten to a much greater extent, the separator will maintain pores to thereby prevent the airtightness of the separator from becoming infinite. As a result, the airtightness can be controlled so as to be held in the range of more than 1000 sec/100 cc. If there is a demand for a separator having a much higher degree of airtightness, it is possible to easily manufacture a separator which maintains the pores for the passage of ions and has increased airtightness by increasing the extent of the beating of the raw material or the thickness or density of the separator. As the raw material is beaten harder, the opacity of the separator becomes more noticeable. The reason for this is that the voids in the wet paper web become smaller as the raw material is beaten harder to thereby increase optical reflection. As a result, the opacity of the separator becomes more noticeable.

FIG. 3 is a graph showing the relationship between the extent of beating and the airtightness of the separators shown in examples 2 through 6. The horizontal axis represents the extent of beating; the left vertical axis represents modified CSF values; and the right vertical axis represents airtightness. For example, in regards to a graph representing modified CSF values, as can be seen from the left vertical axis, the modified CSF value of example 2 is 700 ml. With regards to a graph representing the airtightness, as can be seen from the right vertical axis, example 2 has an airtightness of 1100 sec/100 cc. As shown in the drawing, it is acknowledged that the modified CSF value decreases as the raw material is beaten harder, whilst the airtightness of the separator increases as the raw material is beaten harder.

As shown in Table 2, the ESR of the separator decreases as the raw material is beaten harder. For example, the ESR of the separator of example 2 which is manufactured from the raw material beaten to a modified CSF value of 700 ml is 2.369 Ω/1 kHz. In contrast, the ESR of the separator of example 6, which is manufactured from the raw material beaten to a modified CSF value of 50 ml is considerably reduced to 0.588 Ω/1 kHz. This result is completely opposite to the results of the existing separators. The present invention has the revolutionary advantage of improving the ESR by beating the raw material harder. The airtightness of the existing separator increases as the raw material is beaten harder, thereby resulting in the deterioration of the ESR of the separator. In contrast, and in accordance with the present invention, this relationship is reversed. As a result, a separator having both high airtightness and improved ESR can be manufactured. The reason for this is that the original profile of cellulose fibers is broken as the cellulose fibers are beaten to a greater extent, and the external fibrillation of the cellulose fibers proceeds. The proportion of fibrils having a fiber diameter of about 0.4 μm is increased, and the fiber diameter is reduced. As a result, the denseness of a resultant separator is increased, and the formation of the separator becomes uniform. Further, the separator is still porous and has minute pores which permit the passage of ions. In short, and in accordance with the present invention, it is possible to improve the ESR of the separator by a synergistic effect of pores and fibers which have a small diameter and each serve as an independent separator.

In example 7, the wet paper web was dried by freeze-drying instead of by replacing moisture with a solvent. It is understood that the separator obtained in this example 7 has an opaque appearance, causes light reflection, and contains a plurality of voids in the paper layer. In comparison with the separator in example 6, the separator which is shown in example 7 and is manufactured from the same material as that of the separator of example 6 has an airtightness of 17600 sec/100 cc. Specifically, the separator of example 7 has improved over the separator of example 6 by about 2.5 times with regard to its airtightness. In contrast, the ESR of the separator of example 7 is 2.164 Ω/1 kHz; namely, the separator of example 7 has worsened over the separator of example 6 by about 4 times with regard to its ESR. It is thought that this is ascribable to the attraction of fibers caused by the presence of the water when the paper is dried, although a larger number of the pores formed in the wet paper web are still maintained in comparison with the number of pores remaining in the paper after it has been dried in an ordinary way. However, the ESR of the separator in example 7 is equivalent to that of the separator of in example 2, and the airtightness of the separator of example 7 is about 17 times as large as that of the separator in example 2. Further, if there is a demand for a separator having a much higher degree of airtightness, it is possible to easily manufacture such a separator by increasing the extent of the beating the raw material or the thickness or density of the separator.

As in the case of the separator of example 6, a separator manufactured in an example 8 has a white opaque appearance. The reason for this is that the voids in the paper layer cause light reflection, as in the separator of example 6. Although having an airtightness of 6000 sec/100 cc, the separator of example 8 is far inferior in denseness to the separator of example 6. The reason for this is that the inorganic filler mixed into the cellulose causes the inorganic filler to attract less pulp fibers while the paper is in a wet state. However, the ESR of the separator of example 8 is decreased to 0.548 $\Omega$/1 kHz corresponding to the amount of the added inorganic filler in comparison with the ESR of 0.588 $\Omega$/1 kHz of the separator of example 6.

Examples 9 and 10

In example 9, highly-airtightened porous paper is manufactured from the same material as that of the separator of example 4 so as to have a larger thickness. In example 10, highly-airtightened porous paper is manufactured from the same material as that of the separator of example 6, so as to have a smaller thickness. Table 3 shows the thickness, density, and airtightness of the thus-manufactured highly-airtightened porous paper.

As shown in Table 3, the paper is manufactured from the raw material beaten to a modified CSF value of 210 ml to a thickness of 95.8 $\mu$m in example 9, and the thus-manufactured paper has an airtightness of 14,000 sec/100 cc. The paper is manufactured from the raw material beaten to a modified CSF value of 50 ml to a thickness of 24.6 $\mu$m in example 10, and the thus-manufactured paper has an airtightness of 3,000 sec/100 cc. In this way, airtightness of 1000 sec/100 cc or more can be controlled by adjusting the extent of the beating of the raw material and the thickness of the paper.

Examples 11 and 12

In example 11, wet paper web is manufactured from beaten pulp by a cast process, and the thus-manufactured wet paper web is dried by freeze-drying. In example 12, wet paper web is manufactured from MFC by a cast process, and the thus-manufactured wet paper web is dried by air blow. In example 11, Kraft pulp (NUKP) beaten to a modified CSF value of 30 ml is dispersed into water, and the pulp is cast on a plane plate to thereby produce a wet film as wet paper web. After having been frozen in a refrigerator (at a temperature of −70° C. for one hour), the paper is placed on a heat-up rack provided in a freeze-drier. The air in the refrigerator is evacuated to 0.1 mBa, and the frozen ice included in the wet paper web is sublimed to thereby produce highly-airtightened porous paper. Although the heat-up rack was heated up to about 10° C. in order to increase the speed of sublimation of the ice, caution was paid to prevent the ice from melting and changing into a liquid. It took about 12 hours to finish drying the paper. In example 12, MFC (known by the tradename Cerish KY-110S produced by Daicel Chemical Industries Ltd.) is dispersed into ethyl alcohol instead of dispersing cellulose into water, and a wet film is produced as wet paper web by casting. The ethyl alcohol remaining in the wet paper web is dried by air blow, whereby a highly-airtightened porous paper is manufactured. A homogenizer is used to disperse MFC into ethyl alcohol. Table 4 shows the thickness, density, and airtightness of the thus-manufactured highly-airtightened porous paper.

As shown in Table 4, the paper manufactured in example 11 has an airtightness of 8,000 sec/100 cc, and the paper manufactured in example 12 has an airtightness of 6,000 sec/100 cc. Accordingly, the present invention can be practiced even by drying the wet paper web by means of freeze-drying instead of by means of replacing moisture with a solvent, by manufacturing wet paper web by means of dispersion of the material into an organic solvent without use of water, or by drying the organic solvent remaining in the wet paper web.

Results of the manufacture of the non-aqueous battery will be described with reference to examples and comparative examples.

Example 13

In example 13, wood pulp (NUKP: Needleholt Unbleached Kraft Pulp) was beaten to a modified CSF value of 300 ml through use of a double disk refiner. This wood pulp was dispersed into water, and wet paper web was manufactured by the Fourdrinier machine. The wet paper web was taken up in the form of a roll after excessive moisture had been removed from the wet paper web through use of press rollers. As shown in FIG. 4, the rolled wet paper web was immersed into ethyl alcohol twice, to thereby replace moisture in the wet paper web with ethyl alcohol. The ethyl alcohol and remaining water were dried by a drier, so that a single layer of highly-airtightened porous paper having a thickness of 24.1 $\mu$m and a density of 0.414 g/cm$^3$ was manufactured.

Comparative Examples 3 and 4

Separators of comparative examples 3 and 4 are manufactured from the same wood pulp (NUKP: Needleholt Unbleached Kraft Pulp) as that used in example 13. In the comparative example 3, wet paper web is manufactured from the material which is beaten to a modified CSF value of 800 ml. In the comparative example 4, wet paper web is manufactured from the material beaten to a modified CSF value of 300 ml, as in example 13. In each case, the wet paper web is dried by an ordinary papermaking method through use of a drier without replacing the moisture in the wet paper web with ethyl alcohol. In the comparative example 3, the separator is manufactured, to have a thickness of 23.8 $\mu$m and a density of 0.422 g/cm$^3$ which are substantially the same as those of the separator of example 13. In the comparative example 4, the separator is manufactured so as to have a thickness of 14.0 $\mu$m and a density of 0.715 g/cm$^3$. Non-aqueous batteries similar to that of example 13 were manufactured through use of the thus-formed separators of the comparative examples 3 and 4. Table 6 shows the thickness, density, and airtightness of the separators manufactured in example 13 and the comparative examples 3 and 4, and the proportion of short-circuit failures and capacity of the non-aqueous batteries formed from these separators.

In example 13, the unbleached Kraft pulp is used as raw material, i.e., cellulose, and therefore the resultant paper should have a brownish appearance. However, in practice, the paper has a white opaque appearance. The reason the paper has a white opaque appearance is that the voids in the wet paper web are maintained, as a result of the wet paper web being dried by replacing moisture with a solvent, and the voids cause irregular reflection. The airtightness of the paper manufactured in example 13 is 5,000 sec/100 cc, and hence the paper has a considerably high denseness. However, as can be seen from the passage of the air, it is ascertained that the voids are present in the paper. Accordingly, the passages for ions are ensured even in the paper having high airtightness. As described above, an airtightness of 1000 sec/100 cc which is impossible to achieve by the existing method is accomplished in example 13. The proportion of short-circuit failures occurring in a non-aqueous battery when it is assembled through use of this separator is 0%. Further, since the battery employs a separator consisting of cellulose, the proportion of short-circuit failures occurring in the battery when it is left in an oven at a temperature of 200° C. for ten minutes is also 0%. Therefore, it is acknowledged that the separator has resistance to a heat of 200° C. or more. Further, the separator has a thickness of 24.1 $\mu$m and a density of 0.414 g/cm$^3$. In spite of the fact that the cellulose is beaten to a modified CSF value of 300 ml, the separator of example 13 has a density which is considerably smaller than that of the paper manufactured in the comparative example 4. Since the moisture in the wet paper web is not replaced with the solvent in the comparative example 4, the thickness of the separator is 14.0 $\mu$m which is smaller than that of the paper manufactured in example 13, in spite of the fact that the paper of the comparative example 4 is manufactured from the same wet paper web as is used in example 13. Further, the paper manufactured in the comparative example 4 has a density of 0.715 g/cm$^3$ which is larger than that of the paper manufactured in example 13 and has a brownish appearance and the shape of a film. Further still, no pores are formed in the paper, and the airtightness of the paper is infinite and impossible to measure. Although the proportion of short-circuit failures is zero both at the time of assembly and heating of the battery, the battery is neither chargeable nor dischargeable as will be described later. Therefore, this battery becomes useless. Although, the separators manufactured from the same material in example 13 and the comparative example 4, are greatly different in thickness and density from each other. This can be ascribed to the fact that the fibers attract each other as a result of the evaporation of water having large surface tension when the wet paper web of the comparative example 4 is dried without replacing moisture with a solvent. In contrast, in example 13, the fibers weakly attract each other as a result of the evaporation of water, after the moisture in the wet paper web has been replaced with a solvent, so that the paper has a low density. Consequently, in accordance with example 13, it is possible to manufacture a highly-airtightened separator having pores, a low density, and denseness even through use of the beaten raw material.

When the separator of the comparative example 3 which has nearly the same thickness and density as those of the separator in example 13 is compared with the separator of example 13, the airtightness of the separator of the comparative example 13 is 1 sec/100 cc. It is acknowledged that the separator does not have any denseness, in spite of the presence of pores in the separator. Accordingly, desired airtightness cannot be achieved. The reason for this is that although the fibers attract each other as a result of evaporation of water having large surface tension, the diameter of a fiber is large owing to the less-hard beating of the raw material, and there is a low degree of contact between the fibers. As a result, the proportion of short-circuit failures occurring at the time of assembly of the battery is 70% (14 batteries of a total of 20 batteries), and the proportion of short-circuit failures occurring at the time of heating operations is 50% (3 batteries out of a total of 6 batteries).

The thus-manufactured non-aqueous batteries are compared with each other. The battery manufactured in example 13 has an airtightness as high as 5,000 sec/100 cc and a discharge capacity of 415 mAh/0.5A. This battery is better than the comparative example 3, which has an airtightness of 1 sec/100 cc. In accordance with the present invention, it is possible to ensure pores which permit the passage of ions by virtue of pores in the separator even if the separator has very high airtightness. It is also possible to provide a non-aqueous battery which has superior ESR owing to a small diameter of fibers and accomplishes a very small proportion of short-circuit failures and large electrical capacity. Since the separator of the comparative example 4 is manufactured from the same wet paper web as that used in example 13 without replacing moisture with a solvent, there are no pores in the separator, thereby making it impossible charge or discharge the battery. In this way, the battery becomes useless.

Example 14

In example 14, unbleached Manila hemp pulp was beaten to a modified CSF value of 200 ml to a greater extent through use of a double disk refiner. This manila pulp was dispersed into water, and wet paper web was manufactured by the Fourdrinier machine. The wet paper web was taken up in the form of a roll while it is in a wet state. As shown in FIG. 4, the rolled wet paper web was immersed into ethyl alcohol twice, to thereby replace moisture in the wet paper web with ethyl alcohol. The ethyl alcohol and remaining water were dried by a drier, so that a separator having a thickness of 26.0 $\mu$m and a density of 0.380 g/cm$^3$ was manufactured. A non-aqueous battery was manufactured through use of this separator of example 14.

Comparative Example 5

In comparative example 5, the unbleached Manila hemp pulp, which is similar to that used in example 14, is beaten to a modified CSF value of 780 ml, dispersed into water, and wet paper web was manufactured by the cylinder machine. The moisture in the wet paper web was dried by the ordinary papermaking method through use of the drier. Thus, a separator which is substantially the same as that of example 14 was manufactured and has a thickness of 25.4 $\mu$m and a density of 0.396 g/cm$^3$. A non-aqueous battery was manufactured through use of this separator of the comparative example 5.

Comparative Examples 6 and 7

In comparative example 6, a non-aqueous battery was manufactured through use of a porous polyethylene film used as a separator, in an existing non-aqueous battery. In a comparative example 7, a non-aqueous battery was manufactured through use of a porous polypropylene film used as a separator, in an existing non-aqueous battery. Table 7 shows the thickness, density, and airtightness of the separators manufactured in example 14 and the comparative examples 5, 6, and 7, and the proportion of short-circuit failures and capacity of the non-aqueous batteries formed from these separators.

Although the airtightness of the paper manufactured in example 14 is 3,500 sec/100 cc, as can be seen from the passage of the air, it is ascertained that the voids are present in the separator. Accordingly, the passages for ions are ensured even in the separator having high airtightness. Both the proportion of short-circuit failures occurring in a non-aqueous battery when it is assembled and the proportion of short-circuit failures occurring in the same when it is subjected to heat are 0%. Further, the battery of example 14 has a superior discharge capacity of 410 mAh/0.5A. The separator manufactured in the comparative example 5 has nearly the same thickness and density as that manufactured in example 14. However, the separator of the comparative example 5 is manufactured from less beaten row material and has an airtightness of 1 sec/100 cc. For the batteries which employ this separator, the proportion of short-circuit failures occurring during the assembly of the battery is as high as 75% (i.e., 15 batteries out of a total of 20 batteries). The proportion of short-circuit failures occurring when they are subjected to heat is as high as 60% (i.e., three batteries out of a total of 5 five batteries). As can be seen from the proportion of short-circuit failures occurring when the batteries are subjected to heat in the comparative example 5, even if the separator is manufactured from cellulose, it is still impossible to achieve resistance to a heat of 200° C. or more, unless the separator has high airtightness. The comparative examples 6 and 7 show the non-aqueous battery manufactured through use of a porous polyethylene film used as a separator, in an existing non-aqueous battery and the non-aqueous battery manufactured through use of, as a separator, a porous polypropylene film used in an existing non-aqueous battery. The battery of the comparative example 6 has an airtightness as high as 8,300 sec/100 cc, and the battery of the comparative example 7 has airtightness as high as 9,000 sec/100 cc. Further, batteries of both comparative examples have a large capacity. The porous polyethylene film has resistance to a temperature, at most, of 120° C., and the porous polypropylene film has resistance to a temperature of 160° C. Therefore, if the batteries including these films are heated to a temperature of 200° C. or more, the films will be fused. A total number of batteries will cause a short circuit (i.e., 20 batteries out of a total of 20 batteries), and hence it is ascertained that these films are inferior in terms of heat resistance. In contrast, since the battery of example 14 uses a highly-airtightened porous separator consisting of cellulose, the proportion of short-circuit failures occurring when the batteries are assembled and when they are heated at a temperature of 200° C. is 0%. The separator used in this battery has heat resistance superior to that of the existing porous polyethylene film, and the battery is the same in capacity to the battery using the existing porous polyethylene film.

As has been described in detail, in accordance with the present invention, the moisture retained in the voids formed between the cellulose fibers while the paper is in a wet state, was dried by replacing the moisture with a solvent or by freeze-drying. Alternatively, wet paper web is manufactured by dispersing cellulose fibers into an organic solvent, and the thus-manufactured wet paper web is dried by evaporating the organic solvent remaining in the wet paper web. In contrast with the existing papermaking method, the present invention enables the prevention of adjacent fibers, from strongly attracting each other and from being brought into close contact with each other by hydrogen bonding, when water evaporates from the wet paper web in the drier process. Consequently, it is possible to manufacture, from minute cellulose fibers having a fiber diameter of 1 μm or less, a highly-airtightened porous separator which retains voids in the wet paper web as is and has minute pores, a low degree of density, and denseness without increasing the thickness of the separator. More specifically, there can be obtained a highly-airtightened porous separator which has a thickness of 100 μm or less and an airtightness of 1000 sec/100 cc or more. In short, even if the highly-airtightened porous separator of the present invention is manufactured from a hardly-beaten raw material, the separator contains pores and has a low degree of density, denseness, and a high degree of airtightness. Further, the separator has a white opaque appearance, which indicates the presence of many voids in the separator. When the separator is impregnated with an electrolyte, ions experience no hardness at the time of transmission. Further, the separator accepts water, oil, and other solvents well. The reason for this is that the hydroxyl group in the cellulose causes the separator to accept a hydrophilic solvent, and minute pores permit the impregnation of a non-aqueous solvent into the separator. Because of these characteristics of the separator, there is an expectation that the separator will be widely used as a battery separator or a separator used in an electrolytic capacitor. Further, since the pores formed in the paper are minute and the paper has a low degree of density and a high degree of air gap, the separator produces a large filtering effect. Particularly, although an existing filter captures minute particles by increasing in the thickness of the filter, even if the highly-airtightened porous paper of the present invention is thin, the paper can realize a high degree of capturing.

Therefore, highly-airtightened porous inexpensive paper which has superior chemical/heat resistance and denseness can be manufactured from cellulose which is a reproducible natural resource, and this paper can be applied in the field in which existing porous films are not used, in the field in which the porous films cannot be used owing to their heat and chemical resistance, or the field in which the use of a porous film is feasible but does not pay off.

Further, in accordance with the present invention, it is possible produce a porous and highly-airtightened separator which has a high degree of airtightness, in order to improve the proportion of short-circuit deficiencies and retains pores for the passage of ions in order to improve the ESR of the separator. When the separator is impregnated with an electrolyte, ions experience no hardness at the time of transmission. As a result, the reliability of a non-aqueous battery, such as a lithium-ion secondary battery recently springing into wide use, can be improved, so that the widespread use of the non-aqueous battery can be promoted. Further, it is possible to increase the application of a porous film manufactured from polyolefine-based resin to the field in which the film has not been used owing to its insufficient heat resistance. More specifically, a porous film having resistance to a heat of 230° C. can be made from cellulose. For example, in the case of a lithium-ion battery, there is a demand for a separator which retains its shape at a temperature of 190° C. or more which is the ignition point of lithium. Since cellulose is a reproducible natural resource, the conversion of finite petroleum resources to reproducible natural resources can be realized.

What is claimed is:

1. A non-aqueous battery with a porous highly-airtightened paper separator, comprising:
   a non-aqueous battery cell encasing a positively-active substance and a negatively-active substance; and
   a paper web separates said positively-active substance and said negatively-active substance, and said paper web having an airtightness of no less than 1000 sec/100 cc.

2. A non-aqueous battery as in claim 1, wherein said paper web has a density of no more than 0.6 g/cm$^3$.

3. A non-aqueous battery as in claim 2, wherein said paper web has a thickness of no more than 100 microns.

4. A non-aqueous battery as in claim 1, wherein said paper web has a thickness of no more than 100 microns.

5. A non-aqueous battery as in claim 1, wherein said paper web is formed from cellulose.

6. A non-aqueous battery as in claim 5, wherein said cellulose is comprised of cellulose fibers.

7. A non-aqueous battery as in claim 6, wherein said cellulose fibers have a diameter of no more than 1 micron.

8. A non-aqueous battery as in claim 7, wherein said cellulose fibers have been beaten to a JIS-CSF value of no more than 200 ml.

9. A non-aqueous battery as in claim 7, wherein said cellulose fibers have been beaten to a value of no more than 700 ml measured by modified CSF.

10. A non-aqueous battery as in claim 6, wherein said cellulose fibers are micro-fibrillated cellulose.

11. A non-aqueous battery as in claim 1, wherein said paper web further comprises inorganic fillers.

12. A non-aqueous battery as in claim 11, wherein said inorganic fillers are selected from the group consisting of aluminum borate and potassium titanate.

13. A non-aqueous battery as in claim 1, wherein said positively-active substance is selected from the group consisting of metal chalchogen compounds, lithium composite metal oxides, high polymers, and fluorocarbon.

14. A non-aqueous battery as in claim 13, wherein said metal chalchogen compounds are selected from the group consisting of $TiS_2$, $MoS_2$, and NbSe.

15. A non-aqueous battery as in claim 13, wherein said lithium composite metal oxides are selected from the group consisting of $LiCoO_2$, $LiNiO_2$, and $Li_xMnO_4$.

16. A non-aqueous battery as in claim 13, wherein said high polymers are selected from the group consisting of polyaniline and polypyrrole.

17. A non-aqueous battery as in claim 1, wherein said negatively-active substance is selected from the group consisting of lithium metals, lithium alloys, carbonaceous materials, conductive polymeric material, and metal oxides.

18. A non-aqueous battery as in claim 17, wherein said lithium alloy is LiAl.

19. A non-aqueous battery as in claim 17, wherein said carbonaceous materials are selected from the group consisting of graphites, pyrolytic carbons, pitch cokes, needle cokes, petroleum cokes, and calcined polymeric organic substances.

20. A non-aqueous battery as in claim 17, wherein said conductive polymeric materials are selected from the group consisting of polyacenes and poly-P-phenylenes.

21. A non-aqueous battery as in claim 17, wherein said metal oxides are selected from the group consisting of $Li_xFe_2O_2$ and $Li_xWO_2$.

22. A non-aqueous battery with a porous highly-airtightened paper separator, comprising:

a non-aqueous battery cell encasing a positively-active substance and a negatively-active substance; and a cellulosic paper web separates said positively-active substance and said negatively-active substance, and said cellulosic paper web having an airtightness of no less than 1000 sec/100 cc and a thickness of no more than 100 microns.

23. A non-aqueous battery as in claim 22, wherein said cellulosic paper web has a density of no more than 0.6 g/cm$^3$.

24. A non-aqueous battery as in claim 22, wherein said cellulosic paper web is comprised of cellulose fibers.

25. A non-aqueous battery as in claim 24, wherein said cellulose fibers have a diameter of no more than 1 micron.

26. A non-aqueous battery as in claim 25, wherein said cellulose fibers have been beaten to a JIS-CSF value of no more than 200 ml.

27. A non-aqueous battery as in claim 25, wherein said cellulose fibers have been beaten to a value of no more than 700 ml measured by modified CSF.

28. A non-aqueous battery as in claim 24, wherein said cellulose fibers are micro-fibrillated cellulose.

29. A non-aqueous battery as in claim 22, wherein said cellulosic paper web further comprises inorganic fillers.

30. A non-aqueous battery as in claim 29, wherein said inorganic fillers are selected from the group consisting of aluminum borate and potassium titanate.

31. A non-aqueous battery as in claim 22, wherein said positively-active substance is selected from the group consisting of metal chalchogen compounds, lithium composite metal oxides, high polymers, and fluorocarbon.

32. A non-aqueous battery as in claim 31, wherein said metal chalchogen compounds are selected from the group consisting of $TiS_2$, $MoS_2$, and NbSe.

33. A non-aqueous battery as in claim 31, wherein said lithium composite metal oxides are selected from the group consisting of $LiCoO_2$, $LiNiO_2$, and $Li_xMnO_4$.

34. A non-aqueous battery as in claim 31, wherein said high polymers are selected from the group consisting of polyaniline and polypyrrole.

35. A non-aqueous battery as in claim 22, wherein said negatively-active substance is selected from the group consisting of lithium metals, lithium alloys, carbonaceous materials, conductive polymeric material, and metal oxides.

36. A non-aqueous battery as in claim 35, wherein said lithium alloy is LiAl.

37. A non-aqueous battery as in claim 35, wherein said carbonaceous materials are selected from the group consisting of graphites, pyrolytic carbons, pitch cokes, needle cokes, petroleum cokes, and calcined polymeric organic substances.

38. A non-aqueous battery as in claim 35, wherein said conductive polymeric materials are selected from the group consisting of polyacenes and poly-P-phenylenes.

39. A non-aqueous battery as in claim 35, wherein said metal oxides are selected from the group consisting of $Li_xFe_2O_2$ and $Li_xWO_2$.

40. A non-aqueous battery with a porous highly-airtightened paper separator, comprising:

a non-aqueous battery cell encasing a positively-active substance and a negatively-active substance; and a cellulosic paper web separates said positively-active substance and said negatively-active substance, and said cellulosic paper web having an airtightness of no less than 1000 sec/100 cc and a density of no more than 0.6 g/cm$^3$.

\* \* \* \* \*